(12) United States Patent  
Huang et al.

(10) Patent No.: US 10,470,065 B2  
(45) Date of Patent: Nov. 5, 2019

(54) APPARATUS FOR OBTAINING FREQUENCY DIFFERENCE AND AMPLITUDE SPECTRUM GRAPH, FAULT LOCATION SYSTEM, AND ANTENNA SYSTEM

(71) Applicant: Huawei Technologies Co., Ltd., Shenzhen (CN)

(72) Inventors: Weiheng Huang, Shenzhen (CN); Haidi Xu, Shenzhen (CN); Jiang Fu, Langfang (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/000,555

(22) Filed: Jun. 5, 2018

(65) Prior Publication Data

US 2018/0288639 A1 Oct. 4, 2018

Related U.S. Application Data

(63) Continuation of application No. PCT/CN2017/077944, filed on Mar. 23, 2017.

(30) Foreign Application Priority Data

Apr. 18, 2016 (CN) .......................... 2016 1 0243443

(51) Int. Cl.
*H04W 24/08* (2009.01)
*H04W 24/04* (2009.01)
(Continued)

(52) U.S. Cl.
CPC .......... *H04W 24/08* (2013.01); *H04B 1/0475* (2013.01); *H04B 7/022* (2013.01); *H04W 24/04* (2013.01); *H04B 7/02* (2013.01)

(58) Field of Classification Search
CPC ...... H04W 24/08; H04W 24/04; H04B 7/022; H04B 1/0475; H04B 7/02
See application file for complete search history.

(56) References Cited

U.S. PATENT DOCUMENTS

| 6,236,839 B1 * | 5/2001 | Gu ......................... H01Q 3/267 342/359 |
| 9,912,033 B2 * | 3/2018 | Henry ................ H04B 7/15557 |
| 2016/0105255 A1 * | 4/2016 | Henry ................... H04L 1/0025 |

FOREIGN PATENT DOCUMENTS

| CN | 1399846 A | 2/2003 |
| CN | 101814957 A | 8/2010 |

(Continued)

*Primary Examiner* — Hashim S Bhatti  
(74) *Attorney, Agent, or Firm* — Leydig, Voit & Mayer, Ltd.

(57) ABSTRACT

This application relates to the communications field, and provides an apparatus, a fault location system, and an antenna system, which can be used to locate a faulty node in a DAS, thereby accurately locating a fault source in the DAS. The apparatus includes a signal transmission module sending a detection signal to the branch circuit through an input end of the DAS, and sends a signal processing module the received detection signal and an echo signal returned by the branch circuit, The signal processing module superposes the received detection signal and echo signal. The signal analysis module performs spectrum conversion on the superposed signal, to obtain a frequency difference and amplitude spectrum graph, where the frequency difference and amplitude spectrum graph indicates a correspondence between a location of each node on the main circuit and the branch circuit and an amplitude of the echo signal corresponding to the node.

18 Claims, 24 Drawing Sheets

(51) Int. Cl.
*H04B 1/04* (2006.01)
*H04B 7/022* (2017.01)
*H04B 7/02* (2018.01)

(56) References Cited

FOREIGN PATENT DOCUMENTS

| | | |
|---|---|---|
| CN | 102325339 A | 1/2012 |
| CN | 103384385 A | 11/2013 |
| CN | 103427921 A | 12/2013 |
| CN | 104836628 A | 8/2015 |
| WO | 2016009327 A1 | 1/2016 |
| WO | 2016048370 A1 | 3/2016 |
| WO | 2016053572 A1 | 4/2016 |

* cited by examiner

APPARATUS FOR OBTAINING FREQUENCY DIFFERENCE AND AMPLITUDE SPECTRUM GRAPH, FAULT LOCATION SYSTEM, AND ANTENNA SYSTEM

CROSS-REFERENCE TO RELATED APPLICATIONS

This application is a continuation of International Application No. PCT/CN2017/077944, filed on Mar. 23, 2017, which claims priority to Chinese Patent Application No. 201610243443.2, filed on Apr. 18, 2016. The disclosures of the aforementioned applications are hereby incorporated by reference in their entireties.

TECHNICAL FIELD

This application relates to the communications field, and in particular, to an apparatus for obtaining a frequency difference and amplitude spectrum graph, a fault location system, and an antenna system.

BACKGROUND

Driven by continuous development of antenna systems, a distributed antenna system (DAS) is increasingly widely applied.

Currently, a DAS cannot be monitored. Therefore, when a fault occurs in a node in the DAS, the faulty node in the DAS cannot be located.

SUMMARY

Embodiments of the present disclosure provide an apparatus for obtaining a frequency difference and amplitude spectrum graph, a fault location system, and an antenna system, which can be used to locate a faulty node in a DAS, and therefore can accurately locate a fault source in the DAS.

To achieve the foregoing purpose, the embodiments of the present disclosure use the following technical solutions:

According to a first aspect, an embodiment of the present disclosure provides an apparatus for obtaining a frequency difference and amplitude spectrum graph. The apparatus is applied to a DAS, and the DAS includes one main circuit and multiple branch circuits. The main circuit includes M coupling nodes, and each branch circuit includes N antenna nodes and K coupling nodes, where M, N, and K are all positive integers. The apparatus for obtaining a frequency difference and amplitude spectrum graph includes a signal generation module, a signal transmission module connected to the signal generation module, a signal processing module connected to the signal transmission module, and a signal analysis module connected to the signal processing module. The signal generation module is configured to generate a detection signal and send the detection signal to the signal transmission module. The signal transmission module is configured to receive the detection signal sent by the signal generation module, and send the detection signal to the signal processing module; and for each of at least one branch circuit of the multiple branch circuits, send the detection signal to the branch circuit through a signal input end of the DAS, receive an echo signal returned by the branch circuit, and send the echo signal to the signal processing module, where the echo signal is a signal obtained after the detection signal is reflected by the M coupling nodes on the main circuit and the N antenna nodes and the K coupling nodes on the branch circuit through which the detection signal passes in sequence. The signal processing module is configured to receive the detection signal and the echo signal sent by the signal transmission module, superpose the detection signal and the echo signal, and send a superposed signal to the signal analysis module. The signal analysis module is configured to receive the superposed signal sent by the signal processing module, and perform spectrum conversion on the superposed signal to obtain a frequency difference and amplitude spectrum graph, where the frequency difference and amplitude spectrum graph is used to indicate a correspondence between a location of each node of the M coupling nodes on the main circuit and the N antenna nodes and the K coupling nodes on the branch circuit and an amplitude of the echo signal corresponding to the node.

In the apparatus for obtaining a frequency difference and amplitude spectrum graph provided in this embodiment of the present disclosure, the signal generation module is configured to generate the detection signal; for each of at least one branch circuit of the multiple branch circuits, the signal transmission module is configured to send the detection signal to the branch circuit through the signal input end of the DAS, and receive the echo signal that is returned by the branch circuit and that is obtained after the detection signal is reflected; the signal processing module is configured to superpose the detection signal and the echo signal; and the signal analysis module is configured to perform spectrum conversion on the superposed signal, to obtain the frequency difference and amplitude spectrum graph. The frequency difference and amplitude spectrum graph may be used to indicate the correspondence between the location of each node of the M coupling nodes on the main circuit and the N antenna nodes and the K coupling nodes on the branch circuit and the amplitude of the echo signal corresponding to the node. Therefore, when a fault occurs in the DAS, a fault analysis apparatus in a fault location system can locate a faulty node in the DAS by analyzing the frequency difference and amplitude spectrum graph obtained by the apparatus for obtaining a frequency difference and amplitude spectrum graph, thereby accurately locating a fault source in the DAS.

Optionally, in the apparatus for obtaining a frequency difference and amplitude spectrum graph provided in this embodiment of the present disclosure, the foregoing signal transmission module includes a power splitter, a circulator, and a transmission interface. An input end of the power splitter is connected to an output end of the signal generation module, a first output end of the power splitter is connected to a first end of the circulator, a second output end of the power splitter is connected to the signal processing module, a second end of the circulator is connected to the transmission interface, and a third end of the circulator is connected to the signal processing module. The power splitter is configured to receive, through the input end of the power splitter, the detection signal sent by the signal generation module, send the detection signal to the circulator through the first output end of the power splitter, and send the detection signal to the signal processing module through the second output end of the power splitter. The circulator is configured to receive, through the first end of the circulator, the detection signal sent by the power splitter, and send the detection signal to the transmission interface through the second end of the circulator, where the detection signal is sent to the branch circuit through the transmission interface; and receive, through the second end of the circulator, the echo signal returned by the branch circuit, and send the echo signal to the signal processing module through the third end of the circulator.

Optionally, in this embodiment of the present disclosure, the foregoing transmission interface may be a cable, or may be a wireless module, such as a Wireless Fidelity (Wi-Fi) module or a radio frequency (RF) module.

In this embodiment of the present disclosure, the power splitter may be configured to split the detection signal into two signals, and the circulator may be configured to ensure that the echo signal that is obtained after the detection signal is reflected by the N antenna nodes and the K coupling nodes on the branch circuit can return to the circulator. Therefore, the signal processing module may superpose the detection signal and the echo signal, and then send the superposed signal to the signal analysis module for analysis.

Further, the detection signal is an incident wave signal, and the echo signal is a signal obtained after the detection signal is reflected by the M coupling nodes on the main circuit and the N antenna nodes and the K coupling nodes on the branch circuit through which the detection signal passes in sequence. Therefore, the signal obtained after the detection signal and the echo signal are superposed may be referred to as a standing wave signal.

Optionally, in the apparatus for obtaining a frequency difference and amplitude spectrum graph provided in this embodiment of the present disclosure, the foregoing signal processing module includes a frequency mixer and a filter. A first input end of the frequency mixer is connected to the second output end of the power splitter, a second input end of the frequency mixer is connected to the third end of the circulator, an output end of the frequency mixer is connected to an input end of the filter, and an output end of the filter is connected to the signal analysis module. The frequency mixer is configured to superpose the detection signal and the echo signal, and send the superposed signal to the filter. The filter is configured to receive the superposed signal sent by the frequency mixer, perform filtering on the superposed signal, and send the superposed signal on which filtering is performed to the signal analysis module.

Optionally, in this embodiment of the present disclosure, the foregoing filter may be a band-pass filter.

In this embodiment of the present disclosure, the frequency mixer is configured to perform frequency mixing on the detection signal and the echo signal, and may superpose the detection signal and the echo signal, to obtain the corresponding standing wave signal (that is, the superposed signal). Locations of a wave node and an antinode of the standing wave signal are always constant.

Therefore, a frequency difference and amplitude spectrum graph obtained by using the standing wave signal can relatively accurately indicate the correspondence between the location of each node of the M coupling nodes on the main circuit and the N antenna nodes and the K coupling nodes on the branch circuit and the amplitude of the echo signal corresponding to the node. Therefore, when a fault occurs in the DAS, a fault source in the DAS can be accurately located.

Further, the superposed signal is filtered by using the filter. This can suppress interference to the superposed signal caused by an interference signal.

Optionally, in the apparatus for obtaining a frequency difference and amplitude spectrum graph provided in this embodiment of the present disclosure, the foregoing signal analysis module includes an analog-to-digital converter and a spectrum converter. An input end of the analog-to-digital converter is connected to the output end of the filter, and an output end of the analog-to-digital converter is connected to the spectrum converter. The analog-to-digital converter is configured to convert the superposed signal that is output by the filter and on which filtering is performed to a digital signal, and send the digital signal to the spectrum converter. The spectrum converter is configured to receive the digital signal sent by the analog-to-digital converter, and perform spectrum conversion on the digital signal to obtain the frequency difference and amplitude spectrum graph.

In this embodiment of the present disclosure, the analog-to-digital converter is configured to convert an analog signal to a digital signal, and perform spectrum conversion on the digital signal to obtain a corresponding frequency difference and amplitude spectrum graph. This enables the frequency difference and amplitude spectrum graph to accurately indicate the correspondence between the location of each node of the M coupling nodes on the main circuit and the N antenna nodes and the K coupling nodes on the branch circuit and the amplitude of the echo signal corresponding to the node.

Optionally, the apparatus for obtaining a frequency difference and amplitude spectrum graph provided in this embodiment of the present disclosure further includes at least one of the following three amplifiers: an amplifier connected between the first input end of the frequency mixer and the second output end of the power splitter, an amplifier connected between the second input end of the frequency mixer and the third end of the circulator, or an amplifier connected between the input end of the analog-to-digital converter and the output end of the filter. The amplifier connected between the first input end of the frequency mixer and the second output end of the power splitter is configured to amplify the detection signal output through the second output end of the power splitter, and send the amplified detection signal to the frequency mixer. The amplifier connected between the second input end of the frequency mixer and the third end of the circulator is configured to amplify the echo signal output through the third end of the circulator, and send the amplified echo signal to the frequency mixer. The amplifier connected between the input end of the analog-to-digital converter and the output end of the filter is configured to amplify the superposed signal that is output by the filter and on which filtering is performed, and send the amplified signal to the analog-to-digital converter.

In this embodiment of the present disclosure, a signal strength of the detection signal may decrease in a transmission process (that is, the detection signal attenuates in the transmission process), and a signal strength of the echo signal obtained after the detection signal is reflected is also relatively weak. Therefore, the amplifier connected between the first input end of the frequency mixer and the second output end of the power splitter is configured to amplify the detection signal, to increase the signal strength of the detection signal; and the amplifier connected between the second input end of the frequency mixer and the third end of the circulator is configured to amplify the echo signal, to increase the signal strength of the echo signal. In this way, a signal strength of the signal obtained by superposing the detection signal and the echo signal by the apparatus for obtaining a frequency difference and amplitude spectrum graph can be relatively strong. This may further ensure that a frequency difference and amplitude spectrum graph obtained, by using the superposed signal, by the apparatus for obtaining a frequency difference and amplitude spectrum graph is relatively accurate.

Further, after frequency mixing is performed by the frequency mixer and filtering is performed by the filter on the superposed signal, a signal strength of the superposed signal may be relatively weak. Therefore, the amplifier connected between the input end of the analog-to-digital converter and the output end of the filter is configured to amplify the superposed signal on which filtering is performed, to increase the signal strength of the superposed signal on which filtering is performed. This may ensure that the frequency difference and amplitude spectrum graph obtained by the apparatus for obtaining a frequency difference and amplitude spectrum graph is more accurate.

According to a second aspect, an embodiment of the present disclosure provides an apparatus for obtaining a frequency difference and amplitude spectrum graph. The apparatus is applied to a DAS. The DAS includes one main circuit and multiple branch circuits. The main circuit includes M coupling nodes, and each branch circuit includes N antenna nodes and K coupling nodes, where M, N, and K are all positive integers. The apparatus for obtaining a frequency difference and amplitude spectrum graph includes a first signal generation module, a first signal transmission module connected to the first signal generation module, a first signal processing module connected to the first signal transmission module, and a first signal analysis module connected to the first signal processing module. The first signal generation module is configured to generate a detection signal and send the detection signal to the first signal transmission module. The first signal transmission module is configured to receive the detection signal sent by the first signal generation module, and send the detection signal to the first signal processing module; and for each of at least one branch circuit of the multiple branch circuits, and for each of the N antenna nodes on the branch circuit, send the detection signal to the branch circuit from the antenna node, receive a first echo signal returned by the branch circuit, and send the first echo signal to the first signal processing module, where the first echo signal is a signal obtained after the detection signal is reflected by the M coupling nodes on the main circuit, the antenna node, and the K coupling nodes on the branch circuit through which the detection signal passes in sequence. The first signal processing module is configured to receive the detection signal and the first echo signal sent by the first signal transmission module, superpose the detection signal and the first echo signal, and send a superposed signal to the first signal analysis module. The first signal analysis module is configured to receive the superposed signal sent by the first signal processing module, and perform spectrum conversion on the superposed signal to obtain a first frequency difference and amplitude spectrum graph, where the first frequency difference and amplitude spectrum graph is used to indicate a correspondence between a location of each node of the M coupling nodes on the main circuit, the antenna node, and the K coupling nodes on the branch circuit and an amplitude of the first echo signal corresponding to the node.

In the apparatus for obtaining a frequency difference and amplitude spectrum graph provided in this embodiment of the present disclosure, the first signal generation module is configured to generate the detection signal; for each of at least one branch circuit of the multiple branch circuits, and for each of the N antenna nodes on the branch circuit, the first signal transmission module is configured to send the detection signal to the branch circuit through the antenna node, and receive the first echo signal that is returned by the branch circuit and that is obtained after the detection signal is reflected; the first signal processing module is configured to superpose the detection signal and the first echo signal; and the first signal analysis module is configured to perform spectrum conversion on the superposed signal, to obtain the first frequency difference and amplitude spectrum graph. The first frequency difference and amplitude spectrum graph may be used to indicate the correspondence between the location of each node of the M coupling nodes on the main circuit, the antenna node, and the K coupling nodes on the branch circuit and the amplitude of the first echo signal corresponding to the node. Therefore, when a fault occurs in the DAS, a fault analysis apparatus in a fault location system can locate a faulty node in the DAS by analyzing the first frequency difference and amplitude spectrum graph obtained by the apparatus for obtaining a frequency difference and amplitude spectrum graph, thereby accurately locating a fault source in the DAS.

Optionally, in the apparatus for obtaining a frequency difference and amplitude spectrum graph provided in this embodiment of the present disclosure, the foregoing first signal transmission module includes a first power splitter, a first circulator, and a first transmission interface. An input end of the first power splitter is connected to an output end of the first signal generation module, a first output end of the first power splitter is connected to a first end of the first circulator, a second output end of the first power splitter is connected to the first signal processing module, a second end of the first circulator is connected to the first transmission interface, and a third end of the first circulator is connected to the first signal processing module. The first power splitter is configured to receive, through the input end of the first power splitter, the detection signal sent by the first signal generation module, send the detection signal to the first circulator through the first output end of the first power splitter, and send the detection signal to the first signal processing module through the second output end of the first power splitter. The first circulator is configured to receive, through the first end of the first circulator, the detection signal sent by the first power splitter, and send the detection signal to the first transmission interface through the second end of the first circulator, where the detection signal is sent to the branch circuit through the first transmission interface; and receive, through the second end of the first circulator, the first echo signal returned by the branch circuit, and send the first echo signal to the first signal processing module through the third end of the first circulator.

Optionally, in this embodiment of the present disclosure, the foregoing first transmission interface may be a cable, or may be a wireless module, such as a Wi-Fi module or an RF module.

In this embodiment of the present disclosure, the first power splitter may be configured to split the detection signal into two signals, and the first circulator may be configured to ensure that the first echo signal can return to the first circulator, where the first echo signal is obtained after the detection signal is reflected by the antenna node from which the detection signal is sent and by the K coupling nodes on the branch circuit. Therefore, the first signal processing module may superpose the detection signal and the first echo signal, and then send the superposed signal to the first signal analysis module for analysis.

Further, the detection signal is an incident wave signal, and the first echo signal is a signal obtained after the detection signal is reflected by the M coupling nodes on the main circuit, the antenna node from which the detection signal is sent, and the K coupling nodes on the branch circuit through which the detection signal passes in sequence. Therefore, the signal obtained after the detection signal and the first echo signal are superposed may be referred to as a first standing wave signal.

Optionally, in the apparatus for obtaining a frequency difference and amplitude spectrum graph provided in this embodiment of the present disclosure, the foregoing first signal processing module includes a first frequency mixer and a first filter. A first input end of the first frequency mixer is connected to the second output end of the first power splitter, a second input end of the first frequency mixer is connected to the third end of the first circulator, an output end of the first frequency mixer is connected to an input end of the first filter, and an output end of the first filter is connected to the first signal analysis module. The first frequency mixer is configured to superpose the detection signal and the first echo signal, and send the superposed signal to the first filter. The first filter is configured to receive the superposed signal sent by the first frequency mixer, perform filtering on the superposed signal, and send the superposed signal on which filtering is performed to the first signal analysis module.

Optionally, in this embodiment of the present disclosure, the foregoing first filter may be a band-pass filter.

In this embodiment of the present disclosure, the first frequency mixer is configured to perform frequency mixing on the detection signal and the first echo signal, and may superpose the detection signal and the first echo signal, to obtain the corresponding first standing wave signal (that is, the superposed signal). Locations of a wave node and an antinode of the first standing wave signal are always constant. Therefore, a first frequency difference and amplitude spectrum graph obtained by using the first standing wave signal can relatively accurately indicate the correspondence between the location of each node of the M coupling nodes on the main circuit, the antenna node from which the detection signal is sent, and the K coupling nodes on the branch circuit and the amplitude of the first echo signal corresponding to the node. Therefore, when a fault occurs in the DAS, a fault source in the DAS can be accurately located.

Further, the superposed signal is filtered by using the first filter. This can suppress interference to the superposed signal caused by an interference signal.

Optionally, in the apparatus for obtaining a frequency difference and amplitude spectrum graph provided in this embodiment of the present disclosure, the foregoing first signal analysis module includes a first analog-to-digital converter and a first spectrum converter. An input end of the first analog-to-digital converter is connected to the output end of the first filter, and an output end of the first analog-to-digital converter is connected to the first spectrum converter. The first analog-to-digital converter is configured to convert the superposed signal that is output by the first filter and on which filtering is performed to a digital signal, and send the digital signal to the first spectrum converter. The first spectrum converter is configured to receive the digital signal sent by the first analog-to-digital converter, and perform spectrum conversion on the digital signal to obtain the first frequency difference and amplitude spectrum graph.

In this embodiment of the present disclosure, the first analog-to-digital converter is configured to convert an analog signal to a digital signal, and perform spectrum conversion on the digital signal to obtain a corresponding first frequency difference and amplitude spectrum graph. This enables the first frequency difference and amplitude spectrum graph to accurately indicate the correspondence between the location of each node of the M coupling nodes on the main circuit, the antenna node from which the detection signal is sent, and the K coupling nodes on the branch circuit and the amplitude of the first echo signal corresponding to the node.

Optionally, the apparatus for obtaining a frequency difference and amplitude spectrum graph provided in this embodiment of the present disclosure further includes at least one of the following three amplifiers: a first amplifier connected between the first input end of the first frequency mixer and the second output end of the first power splitter, a second amplifier connected between the second input end of the first frequency mixer and the third end of the first circulator, or a third amplifier connected between the input end of the first analog-to-digital converter and the output end of the first filter. The first amplifier is configured to amplify the detection signal output through the second output end of the first power splitter, and send the amplified detection signal to the first frequency mixer. The second amplifier is configured to amplify the first echo signal output through the third end of the first circulator, and send the amplified first echo signal to the first frequency mixer. The third amplifier is configured to amplify the superposed signal that is output by the first filter and on which filtering is performed, and send the amplified signal to the first analog-to-digital converter.

In this embodiment of the present disclosure, a signal strength of the detection signal may decrease in a transmission process (that is, the detection signal attenuates in the transmission process), and a signal strength of the first echo signal obtained after the detection signal is reflected is also relatively weak. Therefore, the first amplifier is configured to amplify the detection signal, to increase the signal strength of the detection signal; and the second amplifier is configured to amplify the first echo signal, to increase the signal strength of the first echo signal. In this way, a signal strength of the signal obtained by superposing the detection signal and the first echo signal by the apparatus for obtaining a frequency difference and amplitude spectrum graph can be relatively strong. This may further ensure that a first frequency difference and amplitude spectrum graph obtained, by using the superposed signal, by the apparatus for obtaining a frequency difference and amplitude spectrum graph is relatively accurate.

Further, after frequency mixing is performed by the first frequency mixer and filtering is performed by the first filter on the superposed signal, a signal strength of the superposed signal may be relatively weak. Therefore, the third amplifier is configured to amplify the superposed signal on which filtering is performed, to increase the signal strength of the superposed signal on which filtering is performed. This may ensure that the first frequency difference and amplitude spectrum graph obtained by the apparatus for obtaining a frequency difference and amplitude spectrum graph is more accurate.

In the foregoing first aspect and second aspect, the detection signal is a linear frequency-modulated continuous-wave signal.

In this embodiment of the present disclosure, the linear frequency-modulated continuous-wave signal is used as the detection signal. This may ensure that there is a frequency difference between the detection signal and the echo signal (or the first echo signal) that is obtained after the detection signal is reflected by the nodes through which the detection signal passes in sequence. That is, a frequency of the signal obtained by superposing the detection signal and the echo signal is the frequency difference. In this way, distances from these nodes to a test point may be accurately obtained through calculating and analyzing the superposed signal, thereby ensuring that the obtained frequency difference and amplitude spectrum graph (or the first frequency difference and amplitude spectrum graph) is relatively accurate.

According to a third aspect, an embodiment of the present disclosure provides a fault location system. The fault location system is applied to a DAS, and the DAS includes one main circuit and multiple branch circuits. The main circuit includes M coupling nodes, and each branch circuit includes N antenna nodes and K coupling nodes, where M, N, and K are all positive integers. The fault location system includes a first apparatus for obtaining a frequency difference and amplitude spectrum graph, a second apparatus for obtaining a frequency difference and amplitude spectrum graph, and a fault analysis apparatus connected to both the first apparatus for obtaining a frequency difference and amplitude spectrum graph and the second apparatus for obtaining a frequency difference and amplitude spectrum graph. The first apparatus for obtaining a frequency difference and amplitude spectrum graph is the apparatus for obtaining a frequency difference and amplitude spectrum graph according to any one of the foregoing first aspect or the various optional manners of the first aspect. The second apparatus for obtaining a frequency difference and amplitude spectrum graph is the apparatus for obtaining a frequency difference and amplitude spectrum graph according to any one of the foregoing second aspect or the various optional manners of the second aspect. The fault analysis apparatus is configured to: for each of at least one branch circuit of the multiple branch circuits, and for at least one first frequency difference and amplitude spectrum graph of N first frequency difference and amplitude spectrum graphs that are sent by the second apparatus for obtaining a frequency difference and amplitude spectrum graph and that are corresponding to the N antenna nodes on the branch circuit, mutually verify each of the at least one first frequency difference and amplitude spectrum graph and a frequency difference and amplitude spectrum graph sent by the first apparatus for obtaining a frequency difference and amplitude spectrum graph; determine, in the frequency difference and amplitude spectrum graph, a location of each antenna node shown in the first frequency difference and amplitude spectrum graph and a location of a coupling node in the vicinity of at least one of the antenna nodes; and determine, in the frequency difference and amplitude spectrum graph, a location of at least one of the M coupling nodes on the main circuit and locations of at least one antenna node and at least one coupling node on the branch circuit.

In the fault location system provided in this embodiment of the present disclosure, the first apparatus for obtaining a frequency difference and amplitude spectrum graph is configured to obtain the frequency difference and amplitude spectrum graph; the second apparatus for obtaining a frequency difference and amplitude spectrum graph is configured to obtain the N first frequency difference and amplitude spectrum graphs; and the fault analysis apparatus is configured to mutually verify each of at least one first frequency difference and amplitude spectrum graph of the N first frequency difference and amplitude spectrum graphs and the frequency difference and amplitude spectrum graph, and determine, in the frequency difference and amplitude spectrum graph, the location of at least one of the M coupling nodes on the main circuit and the locations of at least one antenna node and at least one coupling node on the branch circuit, thereby determining, in the frequency difference and amplitude spectrum graph, locations of the M coupling nodes on the main circuit and the N antenna nodes and the K coupling nodes on the branch circuit. When a fault occurs in the DAS, the fault location system may locate a faulty node in the DAS by analyzing the frequency difference and amplitude spectrum graph on which the locations of the nodes are determined, thereby accurately locating a fault source in the DAS.

According to a fourth aspect, an embodiment of the present disclosure provides a fault location system. The fault location system is applied to a DAS, and the DAS includes one main circuit and multiple branch circuits. The main circuit includes M coupling nodes, and each branch circuit includes N antenna nodes and K coupling nodes, where M, N, and K are all positive integers. The fault location system includes a first apparatus for obtaining a frequency difference and amplitude spectrum graph and a fault analysis apparatus connected to the first apparatus for obtaining a frequency difference and amplitude spectrum graph. The first apparatus for obtaining a frequency difference and amplitude spectrum graph is the apparatus for obtaining a frequency difference and amplitude spectrum graph according to any one of the foregoing first aspect or the various optional manners of the first aspect. The first apparatus for obtaining a frequency difference and amplitude spectrum graph is configured to: when a fault occurs in the DAS, for each of at least one branch circuit of the multiple branch circuits, send a detection signal to the branch circuit through a signal input end of the DAS, receive an echo signal returned by the branch circuit, superpose the detection signal and the echo signal, perform spectrum conversion on a superposed signal to obtain a fault frequency difference and amplitude spectrum graph, and send the fault frequency difference and amplitude spectrum graph to the fault analysis apparatus. The echo signal is a signal obtained after the detection signal is reflected by the M coupling nodes on the main circuit and the N antenna nodes and the K coupling nodes on the branch circuit through which the detection signal passes in sequence. The fault frequency difference and amplitude spectrum graph is used to indicate a correspondence between a location of each node of the M coupling nodes on the main circuit and the N antenna nodes and the K coupling nodes on the branch circuit and an amplitude of an echo signal corresponding to the node when a fault occurs on the branch circuit. The fault analysis apparatus is configured to receive the fault frequency difference and amplitude spectrum graph sent by the first apparatus for obtaining a frequency difference and amplitude spectrum graph, mutually verify the fault frequency difference and amplitude spectrum graph and a standard frequency difference and amplitude spectrum graph in the fault analysis apparatus, and determine a faulty node in the M coupling nodes on the main circuit and the N antenna nodes and the K coupling nodes on the branch circuit. An amplitude of an echo signal corresponding to the faulty node in the fault frequency difference and amplitude spectrum graph is different from an amplitude of an echo signal corresponding to the faulty node in the standard frequency difference and amplitude spectrum graph. The standard frequency difference and amplitude spectrum graph is used to indicate a correspondence between the location of each node of the M coupling nodes on the main circuit and the N antenna nodes and the K coupling nodes on the branch circuit and an amplitude of an echo signal corresponding to the node when no fault occurs on the branch circuit.

Optionally, the foregoing standard frequency difference and amplitude spectrum graph in the fault analysis apparatus may be obtained and sent to the fault analysis apparatus by the foregoing first apparatus for obtaining a frequency difference and amplitude spectrum graph. In this embodiment of the present disclosure, the standard frequency difference and amplitude spectrum graph may be the frequency difference and amplitude spectrum graph according to any one of the foregoing first aspect or the various optional manners of the first aspect. That is, the frequency difference and amplitude spectrum graph according to any one of the foregoing first aspect or the various optional manners of the first aspect is the frequency difference and amplitude spectrum graph obtained when no fault occurs in the DAS by the first apparatus for obtaining a frequency difference and amplitude spectrum graph.

In the fault location system provided in this embodiment of the present disclosure, when a fault occurs in the DAS, the first apparatus for obtaining a frequency difference and amplitude spectrum graph is configured to obtain a fault frequency difference and amplitude spectrum graph of a branch circuit on which a fault occurs in the DAS. The fault frequency difference and amplitude spectrum graph indicates the correspondence between the location of each node of the M coupling nodes on the main circuit and the N antenna nodes and the K coupling nodes on the branch circuit and the amplitude of the echo signal corresponding to the node when a fault occurs on the branch circuit, and the standard frequency difference and amplitude spectrum graph in the fault analysis apparatus indicates the correspondence between the location of each node of the M coupling nodes on the main circuit and the N antenna nodes and the K coupling nodes on the branch circuit and the amplitude of the echo signal corresponding to the node when no fault occurs on the branch circuit. Therefore, the fault analysis apparatus is configured to mutually verify the fault frequency difference and amplitude spectrum graph and the standard frequency difference and amplitude spectrum graph, to determine whether the amplitude of the echo signal corresponding to each node in the fault frequency difference and amplitude spectrum graph is the same as the amplitude of the echo signal corresponding to each node in the standard frequency difference and amplitude spectrum graph, and determine, as a faulty node, a node corresponding to an echo signal whose amplitudes in the two frequency difference and amplitude spectrum graphs are different. In this way, the fault location system provided in this embodiment of the present disclosure can locate a faulty node in the DAS, thereby accurately locating a fault source in the DAS.

According to a fifth aspect, an embodiment of the present disclosure provides an antenna system. The antenna system includes the fault location system according to the foregoing third aspect or fourth aspect, and a DAS. The DAS includes one main circuit and multiple branch circuits. The main circuit includes M coupling nodes, and each branch circuit includes N antenna nodes and K coupling nodes, where M, N, and K are all positive integers.

In the antenna system provided in this embodiment of the present disclosure, when a fault occurs in the DAS in the antenna system, the fault location system according to the foregoing third aspect or fourth aspect may be configured to locate a faulty node in the DAS, thereby accurately locating a fault source in the DAS.

DESCRIPTION OF EMBODIMENTS

Figure 1:
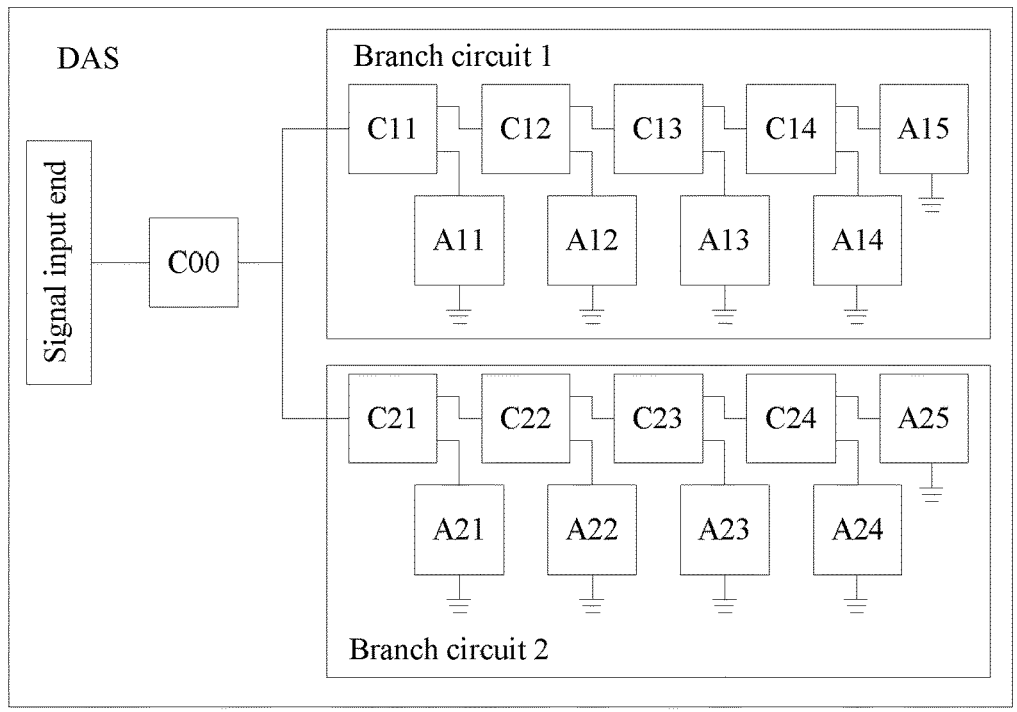
FIG. 1 is a schematic architectural diagram of a DAS according to an embodiment of the present disclosure.

Currently, a DAS cannot be monitored. Therefore, when a fault occurs in a node in the DAS, the faulty node in the DAS cannot be located.

To resolve the foregoing problem, embodiments of the present disclosure provide an apparatus for obtaining a frequency difference and amplitude spectrum graph, a fault location system, and an antenna system. The antenna system includes the fault location system and a DAS. The fault location system includes a first apparatus for obtaining a frequency difference and amplitude spectrum graph, a second apparatus for obtaining a frequency difference and amplitude spectrum graph, and a fault analysis apparatus. The DAS includes one main circuit and multiple branch circuits. The main circuit includes M coupling nodes, and each branch circuit includes N antenna nodes and K coupling nodes, where M, N, and K are all positive integers (that is, M, N, and K are all integers greater than or equal to 1).

For each of at least one branch circuit of the multiple branch circuits, when no fault occurs in the DAS, the first apparatus for obtaining a frequency difference and amplitude spectrum graph obtains a frequency difference and amplitude spectrum graph. The frequency difference and amplitude spectrum graph is used to indicate a correspondence between a location of each node of the M coupling nodes on the main circuit and the N antenna nodes and the K coupling nodes on the branch circuit in the DAS and an amplitude of an echo signal corresponding to the node. For each of the N antenna nodes on the branch circuit, the second apparatus for obtaining a frequency difference and amplitude spectrum graph obtains a first frequency difference and amplitude spectrum graph corresponding to the antenna node. The first frequency difference and amplitude spectrum graph is used to indicate a correspondence between a location of each node of the M coupling nodes on the main circuit, the antenna node, and the K coupling nodes on the branch circuit and an amplitude of a first echo signal corresponding to the node. In this way, the second apparatus for obtaining a frequency difference and amplitude spectrum graph may obtain N first frequency difference and amplitude spectrum graphs corresponding to the N antenna nodes on the branch circuit. Then, the fault analysis apparatus mutually verifies each of at least one first frequency difference and amplitude spectrum graph of the N first frequency difference and amplitude spectrum graphs and the frequency difference and amplitude spectrum graph obtained by the first apparatus for obtaining a frequency difference and amplitude spectrum graph; determines, in the frequency difference and amplitude spectrum graph, a location of each antenna node shown in the first frequency difference and amplitude spectrum graph and a location of a coupling node in the vicinity of the antenna nodes; and determines, in the frequency difference and amplitude spectrum graph, a location of at least one of the M coupling nodes on the main circuit and locations of at least one antenna node and at least one coupling node on the branch circuit.

For each of at least one branch circuit of the multiple branch circuits, when a fault occurs in the DAS, the first apparatus for obtaining a frequency difference and amplitude spectrum graph obtains a fault frequency difference and amplitude spectrum graph. The fault frequency difference and amplitude spectrum graph is used to indicate a correspondence between a location of each node of the M coupling nodes on the main circuit and the N antenna nodes and the K coupling nodes on the branch circuit and an amplitude of an echo signal corresponding to the node when a fault occurs on the branch circuit. Then, the fault analysis apparatus mutually verifies the fault frequency difference and amplitude spectrum graph and a standard frequency difference and amplitude spectrum graph (that is, the foregoing frequency difference and amplitude spectrum graph on which the locations of the nodes are determined) in the fault analysis apparatus; and determines a faulty node in the M coupling nodes on the main circuit and the N antenna nodes and the K coupling nodes on the branch circuit. An amplitude of an echo signal corresponding to the faulty node in the fault frequency difference and amplitude spectrum graph is different from an amplitude of an echo signal corresponding to the faulty node in the standard frequency difference and amplitude spectrum graph. The standard frequency difference and amplitude spectrum graph is used to indicate a correspondence between the location of each node of the M coupling nodes on the main circuit and the N antenna nodes and the K coupling nodes on the branch circuit and an amplitude of an echo signal corresponding to the node when no fault occurs on the branch circuit.

By using the foregoing process, the apparatus for obtaining a frequency difference and amplitude spectrum graph provided in the embodiments of the present disclosure may obtain the corresponding frequency difference and amplitude spectrum graphs. The fault analysis apparatus in the fault location system may finally determine the faulty node in the DAS according to these frequency difference and amplitude spectrum graphs. That is, the apparatus for obtaining a frequency difference and amplitude spectrum graph, the fault location system, and the antenna system provided in the embodiments of the present disclosure can be used to locate the faulty node in the DAS, thereby accurately locating a fault source in the DAS.

With reference to the accompanying drawings, the following separately describes in detail the apparatus for obtaining a frequency difference and amplitude spectrum graph, the fault location system, and the antenna system provided in the embodiments of the present disclosure.

To better describe the apparatus for obtaining a frequency difference and amplitude spectrum graph, the fault location system, and the antenna system provided in the embodiments of the present disclosure, the following first describes an architecture of a DAS.

FIG. 1 shows a schematic architectural diagram of a possible DAS provided in an embodiment of the present disclosure. In FIG. 1, the DAS includes one main circuit and two branch circuits. The two branch circuits are respectively referred to as a branch circuit 1 and a branch circuit 2. The main circuit includes one coupling node (that is, M=1). The branch circuit 1 and the branch circuit 2 each include five antenna nodes (that is, N=5) and four coupling nodes (that is, K=4). In FIG. 1, the coupling node on the main circuit is represented as C00. The five antenna nodes on the branch circuit 1 are respectively represented as A11, A12, A13, A14, and A15. The four coupling nodes on the branch circuit 1 are respectively represented as C11, C12, C13, and C14. The five antenna nodes on the branch circuit 2 are respectively represented as A21, A22, A23, A24, and A25. The four coupling nodes on the branch circuit 2 are respectively represented as C21, C22, C23, and C24. In FIG. 1, any two adjacent coupling nodes are connected by using a cable, and any adjacent antenna node and coupling node are also connected by using a cable. For example, in FIG. 1, C00 and C11 are connected by using a cable (represented by using a connection line between C00 and C11 in FIG. 1), and C11 and A11 are also connected by using a cable.

Further, in FIG. 1, the DAS further includes a signal input end. The signal input end may be a signal source, for example, may be a signal transmit tower of an operator. The signal source is connected to a coupling node, such as C00, on the main circuit by using a cable.

In this embodiment of the present disclosure, the coupling nodes (including the coupling node on the main circuit and the coupling nodes on each branch circuit) in the DAS may be couplers, power splitters, combiners, or other nodes or components that may implement a coupling function. Specifically, the coupling node on the main circuit in the DAS is generally a coupler or a combiner, and a coupling node on a branch circuit in the DAS is generally a coupler or a power splitter. This may be specifically determined according to an actual DAS design requirement. This embodiment of the present disclosure sets no specific limitation.

An embodiment of the present disclosure provides an apparatus for obtaining a frequency difference and amplitude spectrum graph. The apparatus for obtaining a frequency difference and amplitude spectrum graph is applied to a DAS. The DAS includes one main circuit and at least one branch circuit. The main circuit includes M coupling nodes, and each branch circuit includes N antenna nodes and K coupling nodes, where M, N, and K are all positive integers. The DAS may be the foregoing DAS shown in FIG. 1. Specifically, for description of the DAS, refer to related description of the DAS in the embodiment shown in FIG. 1. Details are not described herein again.

Figure 2:
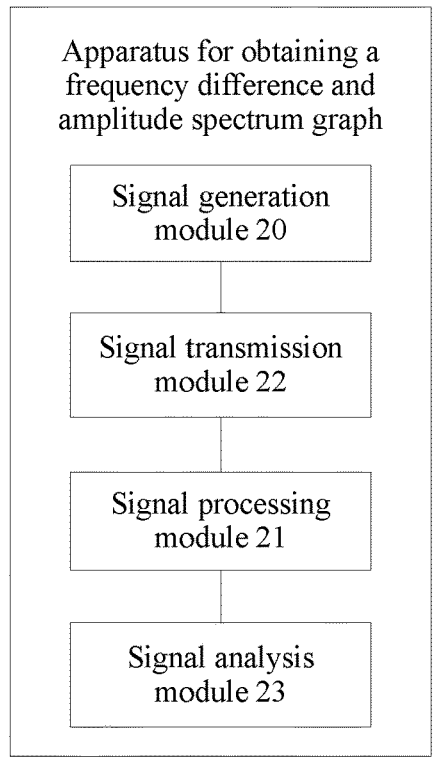
FIG. 2 is a schematic structural diagram 1 of an apparatus for obtaining a frequency difference and amplitude spectrum graph according to an embodiment of the present disclosure.

As shown in FIG. 2, in this embodiment of the present disclosure, the apparatus for obtaining a frequency difference and amplitude spectrum graph includes a signal generation module 20, a signal transmission module 22 connected to the signal generation module 20, a signal processing module 21 connected to the signal transmission module 22, and a signal analysis module 23 connected to the signal processing module 21.

The signal generation module 20 is configured to generate a detection signal and send the detection signal to the signal transmission module 22. The signal transmission module 22 is configured to receive the detection signal sent by the signal generation module 20, and send the detection signal to the signal processing module 21; and for each of at least one branch circuit of the multiple branch circuits in the DAS, send the detection signal to the branch circuit through a signal input end of the DAS, receive an echo signal returned by the branch circuit, and send the echo signal to the signal processing module 21, where the echo signal is a signal obtained after the detection signal is reflected by the M coupling nodes on the main circuit and the N antenna nodes and the K coupling nodes on the branch circuit through which the detection signal passes in sequence. The signal processing module 21 is configured to receive the detection signal and the echo signal sent by the signal transmission module 22, superpose the detection signal and the echo signal, and send a superposed signal to the signal analysis module 23. The signal analysis module 23 is configured to receive the superposed signal sent by the signal processing module 21, and perform spectrum conversion on the superposed signal to obtain a frequency difference and amplitude spectrum graph, where the frequency difference and amplitude spectrum graph is used to indicate a correspondence between a location of each node of the M coupling nodes on the main circuit and the N antenna nodes and the K coupling nodes on the branch circuit and an amplitude of the echo signal corresponding to the node.

In the apparatus for obtaining a frequency difference and amplitude spectrum graph provided in this embodiment of the present disclosure, the signal generation module is configured to generate the detection signal; for each of at least one branch circuit of the multiple branch circuits, the signal transmission module is configured to send the detection signal to the branch circuit through the signal input end of the DAS, and receive the echo signal that is returned by the branch circuit and that is obtained after the detection signal is reflected; the signal processing module is configured to superpose the detection signal and the echo signal; and the signal analysis module is configured to perform spectrum conversion on the superposed signal, to obtain the frequency difference and amplitude spectrum graph. The frequency difference and amplitude spectrum graph may be used to indicate the correspondence between the location of each node of the M coupling nodes on the main circuit and the N antenna nodes and the K coupling nodes on the branch circuit and the amplitude of the echo signal corresponding to the node. Therefore, when a fault occurs in the DAS, a fault analysis apparatus in a fault location system can locate a faulty node in the DAS by analyzing the frequency difference and amplitude spectrum graph obtained by the apparatus for obtaining a frequency difference and amplitude spectrum graph, thereby accurately locating a fault source in the DAS.

For example, the foregoing echo signal is a signal obtained after the detection signal is reflected by C00 on the main circuit and A11, C11, A12, C12, A13, C13, A14, C14, and A15 on the branch circuit 1 that are shown in FIG. 1 and through which the detection signal passes in sequence.

In this embodiment of the present disclosure, the signal generation module may be a signal source.

Figure 3:
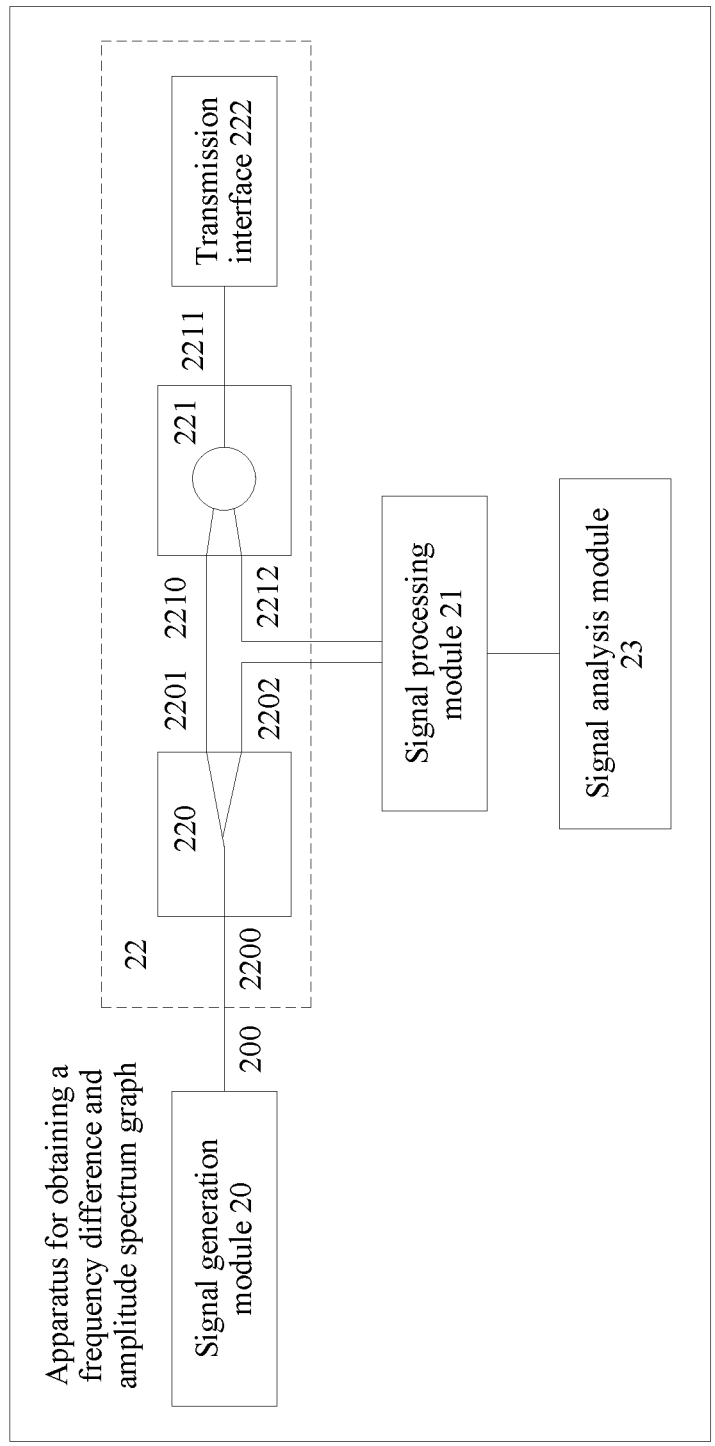
FIG. 3 is a schematic structural diagram 2 of an apparatus for obtaining a frequency difference and amplitude spectrum graph according to an embodiment of the present disclosure.

Optionally, with reference to FIG. 2, as shown in FIG. 3, in the apparatus for obtaining a frequency difference and amplitude spectrum graph provided in this embodiment of the present disclosure, the signal transmission module 22 includes a power splitter 220, a circulator 221, and a transmission interface 222. An input end 2200 of the power splitter 220 is connected to an output end 200 of the signal generation module 20, a first output end 2201 of the power splitter 220 is connected to a first end 2210 of the circulator 221, a second output end 2202 of the power splitter 220 is connected to the signal processing module 21, a second end 2211 of the circulator 221 is connected to the transmission interface 222, and a third end 2212 of the circulator 221 is connected to the signal processing module 21.

The power splitter 220 is configured to receive, through the input end 2200 of the power splitter 220, the detection signal sent by the signal generation module 20, send the detection signal to the circulator 221 through the first output end 2201 of the power splitter 220, and send the detection signal to the signal processing module 21 through the second output end 2202 of the power splitter 220. The circulator 221 is configured to receive, through the first end 2210 of the circulator 221, the detection signal sent by the power splitter 220, and send the detection signal to the transmission interface 222 through the second end 2211 of the circulator 221, where the detection signal is sent to the branch circuit through the transmission interface 222; and receive, through the second end 2211 of the circulator 221, the echo signal returned by the branch circuit, and send the echo signal to the signal processing module 21 through the third end 2212 of the circulator 221.

In this embodiment of the present disclosure, the transmission interface may be a cable or a wireless module. The wireless module may be a Wi-Fi module or an RF module, or may be another wireless module that can implement signal transmission. This embodiment of the present disclosure sets no specific limitation.

In this embodiment of the present disclosure, the power splitter may be configured to split the detection signal into two signals, and the circulator may be configured to ensure that the echo signal that is obtained after the detection signal is reflected by the N antenna nodes and the K coupling nodes on the branch circuit can return to the circulator. Therefore, the signal processing module may superpose the detection signal and the echo signal, and then send the superposed signal to the signal analysis module for analysis.

Further, in this embodiment of the present disclosure, the detection signal is an incident wave signal, and the echo signal is a signal obtained after the detection signal is reflected by the M coupling nodes on the main circuit and the N antenna nodes and the K coupling nodes on the branch circuit through which the detection signal passes in sequence. Therefore, the signal obtained after the detection signal and the echo signal are superposed may be referred to as a standing wave signal.

Figure 4:
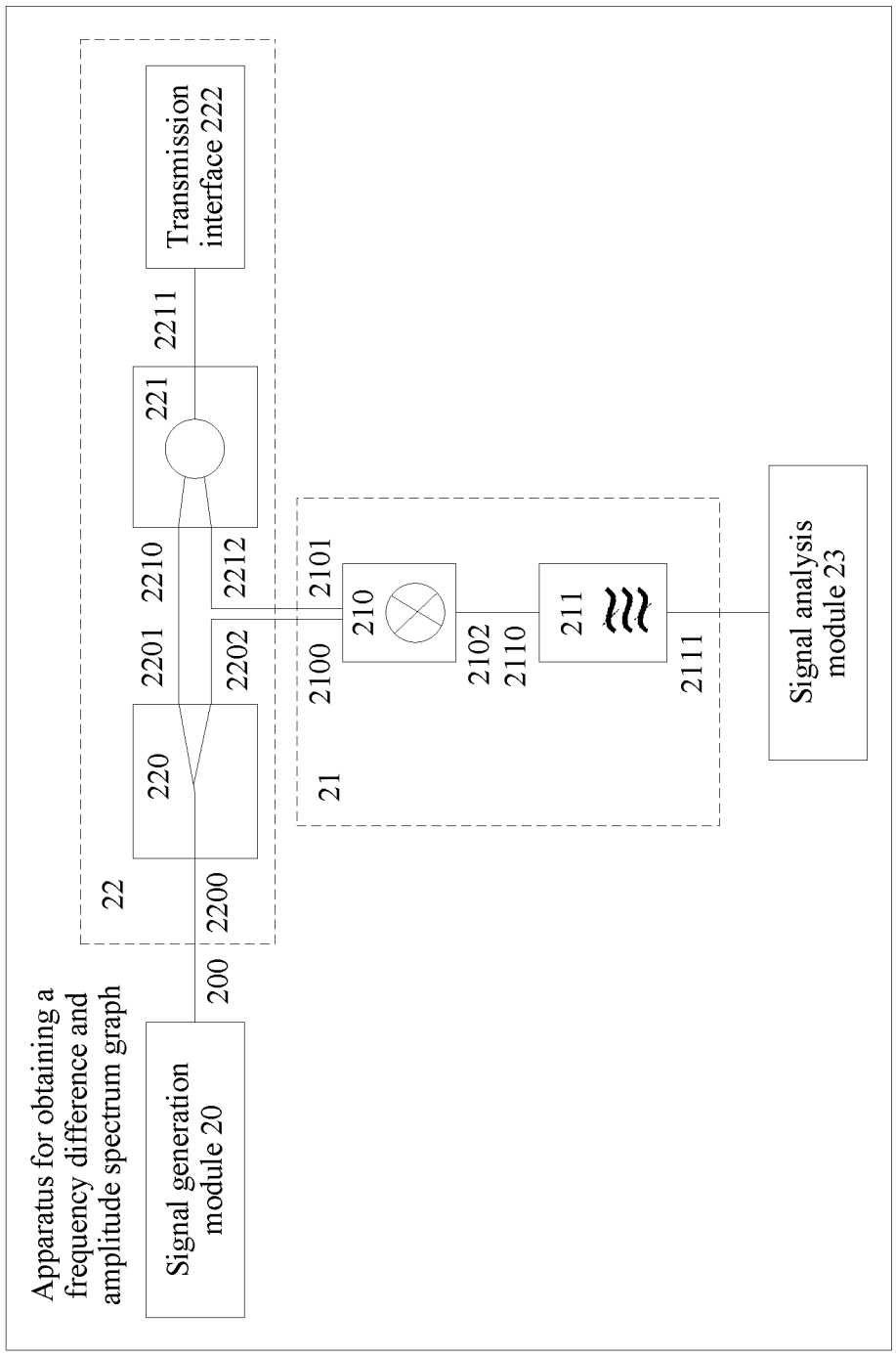
FIG. 4 is a schematic structural diagram 3 of an apparatus for obtaining a frequency difference and amplitude spectrum graph according to an embodiment of the present disclosure.

Optionally, with reference to FIG. 3, as shown in FIG. 4, in the apparatus for obtaining a frequency difference and amplitude spectrum graph provided in this embodiment of the present disclosure, the signal processing module 21 includes a frequency mixer 210 and a filter 211. A first input end 2100 of the frequency mixer 210 is connected to the second output end 2202 of the power splitter 220, a second input end 2101 of the frequency mixer 210 is connected to the third end 2212 of the circulator 221, an output end 2102 of the frequency mixer 210 is connected to an input end 2110 of the filter 211, and an output end 2111 of the filter 211 is connected to the signal analysis module 23.

The frequency mixer 210 is configured to superpose the detection signal and the echo signal, and send the superposed signal to the filter 211. The filter 211 is configured to receive the superposed signal sent by the frequency mixer 210, perform filtering on the superposed signal, and send the superposed signal on which filtering is performed to the signal analysis module 23.

In this embodiment of the present disclosure, the filter may be a band-pass filter.

In this embodiment of the present disclosure, the frequency mixer is configured to perform frequency mixing on the detection signal and the echo signal, and may superpose the detection signal and the echo signal, to obtain the corresponding standing wave signal (that is, the superposed signal). Locations of a wave node and an antinode of the standing wave signal are always constant. Therefore, a frequency difference and amplitude spectrum graph obtained by using the standing wave signal can relatively accurately indicate the correspondence between the location of each node of the M coupling nodes on the main circuit and the N antenna nodes and the K coupling nodes on the branch circuit and the amplitude of the echo signal corresponding to the node. Therefore, when a fault occurs in the DAS, a fault source in the DAS can be accurately located.

Further, the superposed signal is filtered by using the filter. This can suppress interference to the superposed signal caused by an interference signal.

Figure 5:
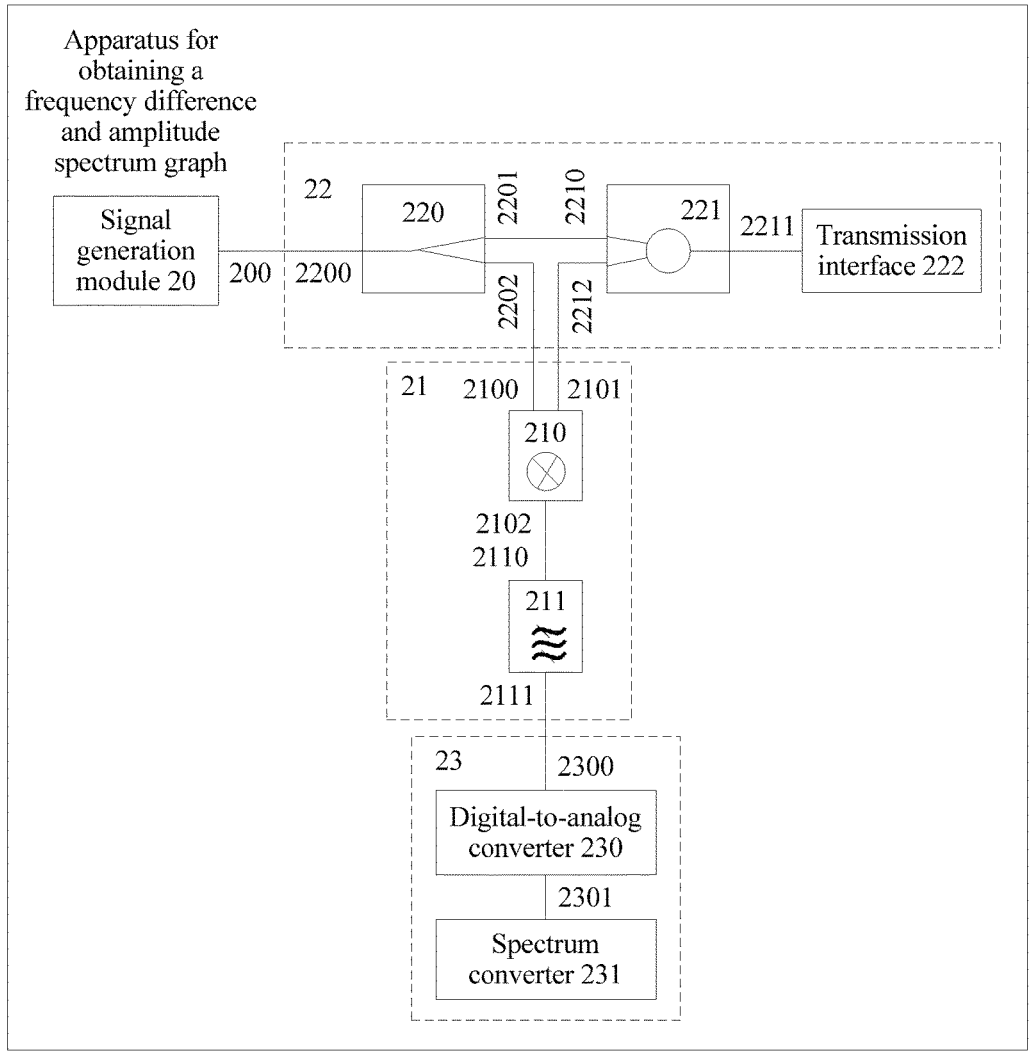
FIG. 5 is a schematic structural diagram 4 of an apparatus for obtaining a frequency difference and amplitude spectrum graph according to an embodiment of the present disclosure.

Optionally, with reference to FIG. 4, as shown in FIG. 5, in the apparatus for obtaining a frequency difference and amplitude spectrum graph provided in this embodiment of the present disclosure, the signal analysis module 23 includes an analog-to-digital converter 230 and a spectrum converter 231. An input end 2300 of the analog-to-digital converter 230 is connected to the output end 2111 of the filter 211, and an output end 2301 of the analog-to-digital converter 230 is connected to the spectrum converter 231.

The analog-to-digital converter 230 is configured to convert the superposed signal that is output by the filter 211 and on which filtering is performed to a digital signal, and send the digital signal to the spectrum converter 231. The spectrum converter 231 is configured to receive the digital signal sent by the analog-to-digital converter 230, and perform spectrum conversion on the digital signal to obtain the frequency difference and amplitude spectrum graph.

In this embodiment of the present disclosure, the analog-to-digital converter is configured to convert an analog signal to a digital signal, and perform spectrum conversion on the digital signal to obtain a corresponding frequency difference and amplitude spectrum graph. This enables the frequency difference and amplitude spectrum graph to accurately indicate the correspondence between the location of each node of the M coupling nodes on the main circuit and the N antenna nodes and the K coupling nodes on the branch circuit and the amplitude of the echo signal corresponding to the node.

Figure 6:
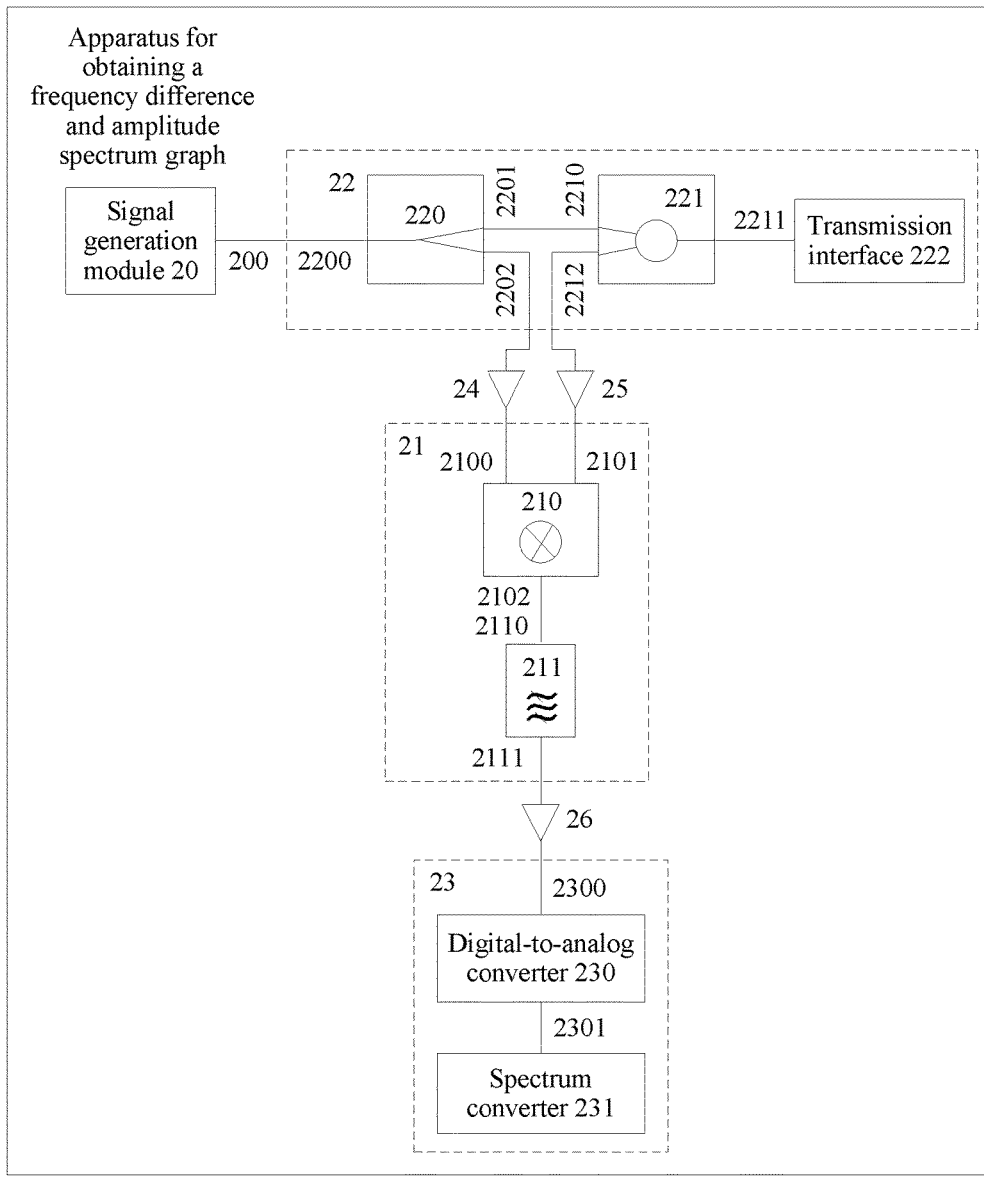
FIG. 6 is a schematic structural diagram 5 of an apparatus for obtaining a frequency difference and amplitude spectrum graph according to an embodiment of the present disclosure.

Optionally, with reference to FIG. 5, as shown in FIG. 6, the apparatus for obtaining a frequency difference and amplitude spectrum graph provided in this embodiment of the present disclosure may further include at least one of the following three amplifiers: an amplifier 24 connected between the first input end 2100 of the frequency mixer 210 and the second output end 2202 of the power splitter 220, an amplifier 25 connected between the second input end 2101 of the frequency mixer 210 and the third end 2212 of the circulator 221, or an amplifier 26 connected between the input end 2300 of the analog-to-digital converter 230 and the output end 2111 of the filter 211.

The amplifier 24 connected between the first input end 2100 of the frequency mixer 210 and the second output end 2202 of the power splitter 220 is configured to amplify the detection signal output through the second output end 2202 of the power splitter 220, and send the amplified detection signal to the frequency mixer 210. The amplifier 25 connected between the second input end 2101 of the frequency mixer 210 and the third end 2212 of the circulator 221 is configured to amplify the echo signal output through the third end 2212 of the circulator 221, and send the amplified echo signal to the frequency mixer 210. The amplifier 26 connected between the input end 2300 of the analog-to-digital converter 230 and the output end 2111 of the filter 211 is configured to amplify the superposed signal that is output by the filter 211 and on which filtering is performed, and send the amplified signal to the analog-to-digital converter 230.

In this embodiment of the present disclosure, a signal strength of the detection signal may decrease in a transmission process (that is, the detection signal attenuates in the transmission process), and a signal strength of the echo signal obtained after the detection signal is reflected is also relatively weak. Therefore, the amplifier connected between the first input end of the frequency mixer and the second output end of the power splitter is configured to amplify the detection signal, to increase the signal strength of the detection signal; and the amplifier connected between the second input end of the frequency mixer and the third end of the circulator is configured to amplify the echo signal, to increase the signal strength of the echo signal. In this way, a signal strength of the signal obtained by superposing the detection signal and the echo signal by the apparatus for obtaining a frequency difference and amplitude spectrum graph can be relatively strong. This may further ensure that a frequency difference and amplitude spectrum graph obtained, by using the superposed signal, by the apparatus for obtaining a frequency difference and amplitude spectrum graph is relatively accurate.

Further, after frequency mixing is performed by the frequency mixer and filtering is performed by the filter on the superposed signal, a signal strength of the superposed signal may be relatively weak. Therefore, the amplifier connected between the input end of the analog-to-digital converter and the output end of the filter is configured to amplify the superposed signal on which filtering is performed, to increase the signal strength of the superposed signal on which filtering is performed. This may ensure that the frequency difference and amplitude spectrum graph obtained by the apparatus for obtaining a frequency difference and amplitude spectrum graph is more accurate.

Optionally, in this embodiment of the present disclosure, the foregoing detection signal may be a linear frequency-modulated continuous-wave signal.

A frequency of a linear frequency-modulated continuous-wave signal changes linearly over time. Therefore, assuming that a frequency of the detection signal sent by the apparatus for obtaining a frequency difference and amplitude spectrum graph provided in this embodiment of the present disclosure is f1, when the detection signal is reflected by a node (which may be a coupling node on the main circuit in the DAS, or an antenna node or a coupling node on a branch circuit in the DAS) and returns to the apparatus for obtaining a frequency difference and amplitude spectrum graph, if a time elapsed until a reflected echo signal returns is t, a frequency of the detection signal generated and sent by the apparatus for obtaining a frequency difference and amplitude spectrum graph is already changed to f1+k×t (where k is a frequency change coefficient). After the apparatus for obtaining a frequency difference and amplitude spectrum graph performs frequency mixing on the echo signal and the detection signal to obtain a superposed signal (that is, a standing wave signal), a frequency of the superposed signal is k×t. Then, the apparatus for obtaining a frequency difference and amplitude spectrum graph may accurately obtain a distance from the node (that is, the node that reflects the detection signal) to a test point through calculation by analyzing the superposed signal.

To better understand a specific implementation of this embodiment of the present disclosure, the following illustratively describes a principle by which the apparatus for obtaining a frequency difference and amplitude spectrum graph obtains a location of each node in the DAS.

Figure 7:
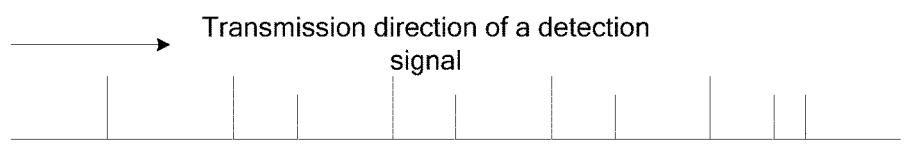
FIG. 7 is a schematic diagram 1 of a relative location of a node in a DAS according to an embodiment of the present disclosure.

In an example, the branch circuit 1 in the DAS shown in FIG. 1 is used as an example. As shown in FIG. 7, by using the foregoing principle of obtaining a distance to a test point from each node that reflects the detection signal, after sending a detection signal to the branch circuit 1 through the signal input end of the DAS, the apparatus for obtaining a frequency difference and amplitude spectrum graph may obtain distances from the coupling node on the main circuit and each antenna node and each coupling node on the branch circuit 1 in the DAS to the test point, that is, may obtain relative locations of the coupling node on the main circuit and the antenna nodes and the coupling nodes on the branch circuit 1 in the DAS. FIG. 7 is a schematic diagram of the relative locations of the coupling node on the main circuit and the antenna nodes and the coupling nodes on the branch circuit 1 in the DAS. Each vertical line in FIG. 7 represents a node that reflects a detection signal. A location of the vertical line on a horizontal coordinate represents a relative location of the node to other nodes in the DAS, and a location of the vertical line on a vertical coordinate represents an amplitude of an echo signal obtained after the detection signal is reflected by the node.

To facilitate better understanding of the principle by which the apparatus for obtaining a frequency difference and amplitude spectrum graph provided in this embodiment of the present disclosure obtains a location of each node in the DAS, the following illustratively describes a simulation result of a frequency difference and amplitude spectrum graph obtained by the apparatus for obtaining a frequency difference and amplitude spectrum graph by using the branch circuit 1 in the DAS shown in FIG. 1 as an example.

It is assumed that, in FIG. 1, a cable length between any antenna node or coupling node and a coupling node that is located before the antenna node or coupling node is as follows:

On the main circuit in the DAS, a cable length between C00 and a combiner located before C00 is 200;

as for the coupling nodes on the branch circuit 1 in the DAS, a cable length between C11 and C00 that is located before C11 is 250, a cable length between C12 and C11 that is located before C12 is 510, a cable length between C13 and C12 that is located before C13 is 420, and a cable length between C14 and C13 that is located before C14 is 600; and as for the antenna nodes on the branch circuit 1 in the DAS, a cable length between A11 and C11 that is located before A11 is 250, a cable length between A12 and C12 that is located before A12 is 2000, a cable length between A13 and C13 that is located before A13 is 1500, a cable length between A14 and C14 that is located before A14 is 2200, and a cable length between A15 and C14 that is located before A15 is 210.

It should be noted that, in this embodiment of the present disclosure, the lengths of the cables between the nodes described above are represented using transmission delays of a signal (a detection signal or an echo signal) in the cables between the nodes. That is, 200, 250, 510, 420, 600, 250, 2000, 1500, 2200, and 210 described above are all transmission delays of a signal in the cables between the corresponding nodes, and a unit of the transmission delays is nanosecond. An actual cable length between nodes may be specifically calculated by using the following formula:

Actual cable length=Transmission speed of a signal in a cable×Transmission delay By using the foregoing formula, an actual cable length between corresponding nodes may be calculated separately according to a transmission speed of a signal in a cable between the nodes and a transmission delay of the signal in the cable between the corresponding nodes.

For example, assuming that a transmission speed of a signal in a cable between A11 and C11 that is located before A11 is X meter/second, and that a transmission delay of the signal in the cable between A11 and C11 is 250 nanoseconds, Actual cable length between A11 and C11=X meter/second×250 nanoseconds.

Figure 8:
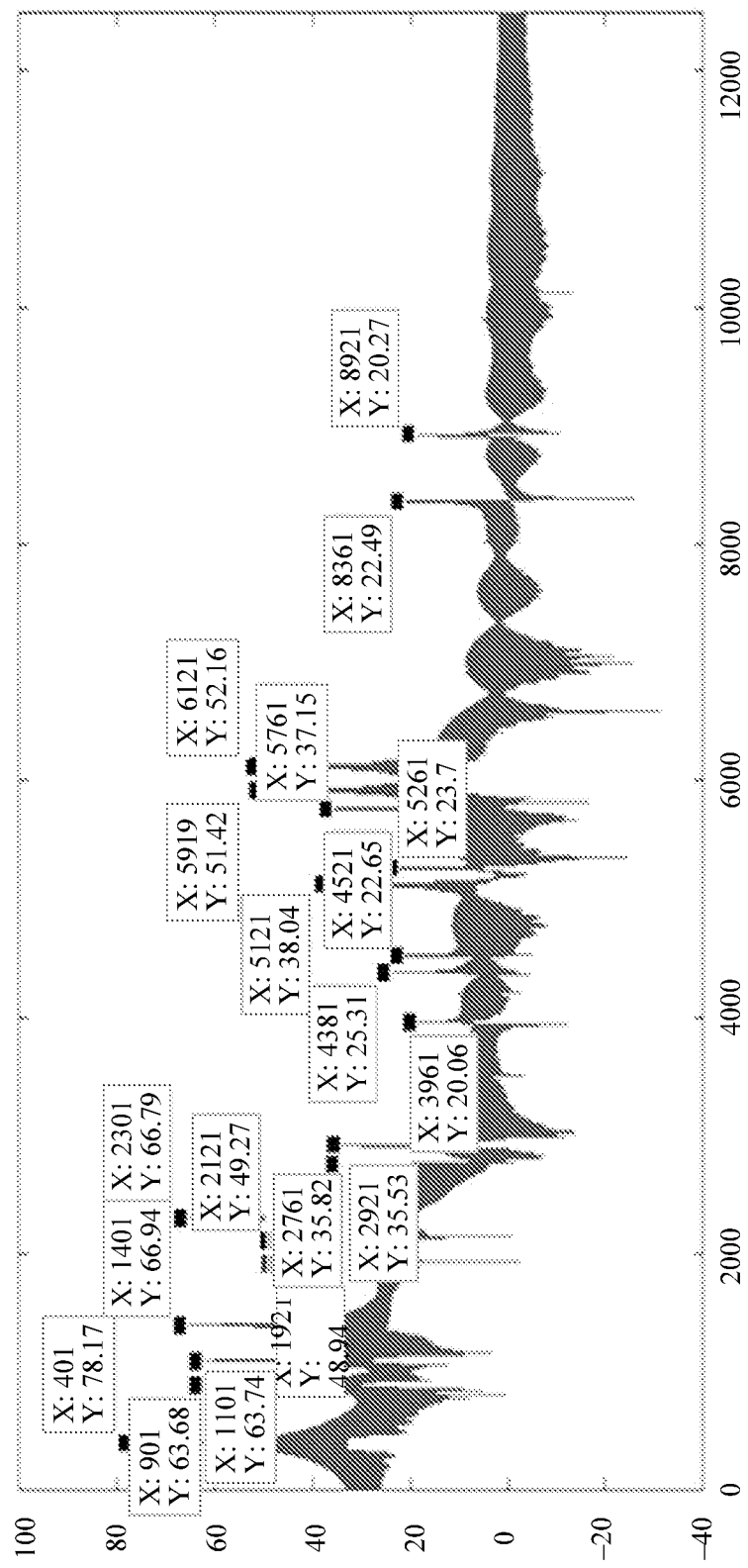
FIG. 8 is a simulation diagram 1 of a frequency difference and amplitude spectrum graph according to an embodiment of the present disclosure.

Based on the foregoing cable length between any antenna node or coupling node and a coupling node that is located before the antenna node or coupling node, FIG. 8 shows a simulation diagram of a frequency difference and amplitude spectrum graph that is obtained after an apparatus for obtaining a frequency difference and amplitude spectrum graph sends a detection signal to a branch circuit 1 and a branch circuit 2 through a signal input end of a DAS and that is corresponding to the branch circuit 1 and the branch circuit 2 (where the simulation diagram may be considered as a frequency difference and amplitude spectrum graph corresponding to nodes in the DAS when there is no faulty node in the DAS). The frequency difference and amplitude spectrum graph shown in FIG. 8 is used to indicate a correspondence between a location of each node of a coupling node on the main circuit, all antenna nodes and all coupling nodes on the branch circuit 1, and all antenna nodes and all coupling nodes on the branch circuit 2 in the DAS and an amplitude of an echo signal corresponding to the node. FIG. 8 is the frequency difference and amplitude spectrum graph, of the branch circuit 1 and the branch circuit 2 in the DAS, obtained by the apparatus for obtaining a frequency difference and amplitude spectrum graph. In this embodiment of the present disclosure, the branch circuit 1 is used as an example for illustrative description. Therefore, the frequency difference and amplitude spectrum graph of the branch circuit 2 (which is similar to the frequency difference and amplitude spectrum graph of the branch circuit 1) shown in FIG. 8 is not described in detail.

It should be noted that, in this embodiment of the present disclosure, the foregoing schematic diagram of the relative locations of the coupling node on the main circuit and the antenna nodes and the coupling nodes on the branch circuit 1 in the DAS shown in FIG. 7 is similar to the frequency difference and amplitude spectrum graph obtained through simulation shown in FIG. 8. The foregoing schematic diagram of the relative locations shown in FIG. 7 is merely a simplified diagram, that is, a theoretical schematic diagram, of a frequency difference and amplitude spectrum graph that is obtained through simulation for more clearly describing the principle, provided in this embodiment of the present disclosure, of obtaining a frequency difference and amplitude spectrum graph. Frequency difference and amplitude spectrum graphs actually obtained by the apparatus for obtaining a frequency difference and amplitude spectrum graph are all like the frequency difference and amplitude spectrum graph shown in FIG. 8.

Optionally, in the foregoing embodiment of the present disclosure, only one branch circuit in the DAS is used as an example. That is, the branch circuit 1 in the DAS shown in FIG. 1 is used as an example for illustrative description. For another branch circuit (such as the branch circuit 2 shown in FIG. 1) in the DAS, a method by which the apparatus for obtaining a frequency difference and amplitude spectrum graph obtains a frequency difference and amplitude spectrum graph is the same as the foregoing method of obtaining the frequency difference and amplitude spectrum graph of the branch circuit 1 in the DAS. For details, refer to related description in the embodiments shown in FIG. 7 and FIG. 8. Details are not described herein again.

An embodiment of the present disclosure provides another apparatus for obtaining a frequency difference and amplitude spectrum graph. The apparatus for obtaining a frequency difference and amplitude spectrum graph is applied to a DAS. The DAS includes one main circuit and at least one branch circuit. The main circuit includes M coupling nodes, and each branch circuit includes N antenna nodes and K coupling nodes, where M, N, and K are all positive integers. The DAS may be the foregoing DAS shown in FIG. 1. Specifically, for description of the DAS, refer to related description of the DAS in the embodiment shown in FIG. 1. Details are not described herein again.

Figure 9:
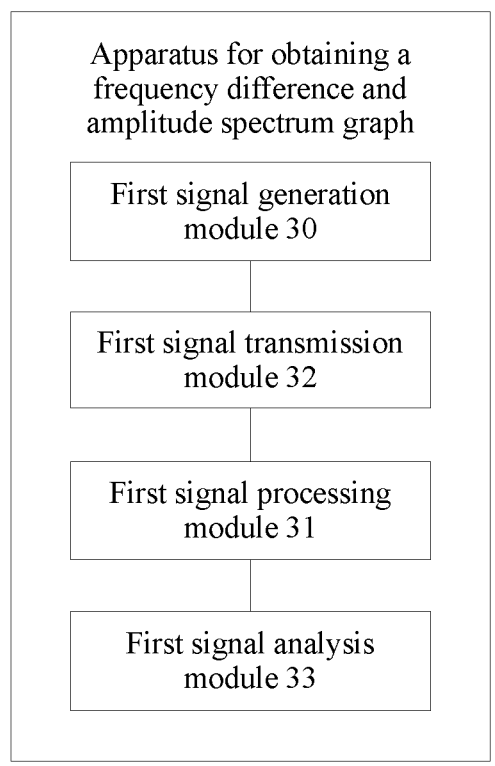
FIG. 9 is a schematic structural diagram 1 of another apparatus for obtaining a frequency difference and amplitude spectrum graph according to an embodiment of the present disclosure.

As shown in FIG. 9, the apparatus for obtaining a frequency difference and amplitude spectrum graph provided in this in this embodiment of the present disclosure includes a first signal generation module 30, a first signal transmission module 32 connected to the first signal generation module 30, a first signal processing module 31 connected to the first signal transmission module 32, and a first signal analysis module 33 connected to the first signal processing module 31.

The first signal generation module 30 is configured to generate a detection signal and send the detection signal to the first signal transmission module 32. The first signal transmission module 32 is configured to receive the detection signal sent by the first signal generation module 30, and send the detection signal to the first signal processing module 31; and for each of at least one branch circuit of the multiple branch circuits, and for each of the N antenna nodes on the branch circuit, send the detection signal to the branch circuit from the antenna node, receive a first echo signal returned by the branch circuit, and send the first echo signal to the first signal processing module 31, where the first echo signal is a signal obtained after the detection signal is reflected by the M coupling nodes on the main circuit, the antenna node, and the K coupling nodes on the branch circuit through which the detection signal passes in sequence. The first signal processing module 31 is configured to receive the detection signal and the first echo signal sent by the first signal transmission module 32, superpose the detection signal and the first echo signal, and send a superposed signal to the first signal analysis module 33. The first signal analysis module 33 is configured to receive the superposed signal sent by the first signal processing module 31, and perform spectrum conversion on the superposed signal to obtain a first frequency difference and amplitude spectrum graph, where the first frequency difference and amplitude spectrum graph is used to indicate a correspondence between a location of each node of the M coupling nodes on the main circuit, the antenna node, and the K coupling nodes on the branch circuit and an amplitude of the first echo signal corresponding to the node.

In the apparatus for obtaining a frequency difference and amplitude spectrum graph provided in this embodiment of the present disclosure, the first signal generation module is configured to generate the detection signal; for each of at least one branch circuit of the multiple branch circuits, and for each of the N antenna nodes on the branch circuit, the first signal transmission module is configured to send the detection signal to the branch circuit through the antenna node, and receive the first echo signal that is returned by the branch circuit and that is obtained after the detection signal is reflected; the first signal processing module is configured to superpose the detection signal and the first echo signal; and the first signal analysis module is configured to perform spectrum conversion on the superposed signal, to obtain the first frequency difference and amplitude spectrum graph. The first frequency difference and amplitude spectrum graph may be used to indicate the correspondence between the location of each node of the M coupling nodes on the main circuit, the antenna node, and the K coupling nodes on the branch circuit and the amplitude of the first echo signal corresponding to the node. Therefore, when a fault occurs in the DAS, a fault analysis apparatus in a fault location system can locate a faulty node in the DAS by analyzing the first frequency difference and amplitude spectrum graph obtained by the apparatus for obtaining a frequency difference and amplitude spectrum graph, thereby accurately locating a fault source in the DAS.

For example, the foregoing first echo signal is a signal obtained after the detection signal is reflected by C00 on the main circuit and C11, C12, C13, C14, and A15 on the branch circuit 1 that are shown in FIG. 1 and through which the detection signal passes in sequence.

Figure 10:
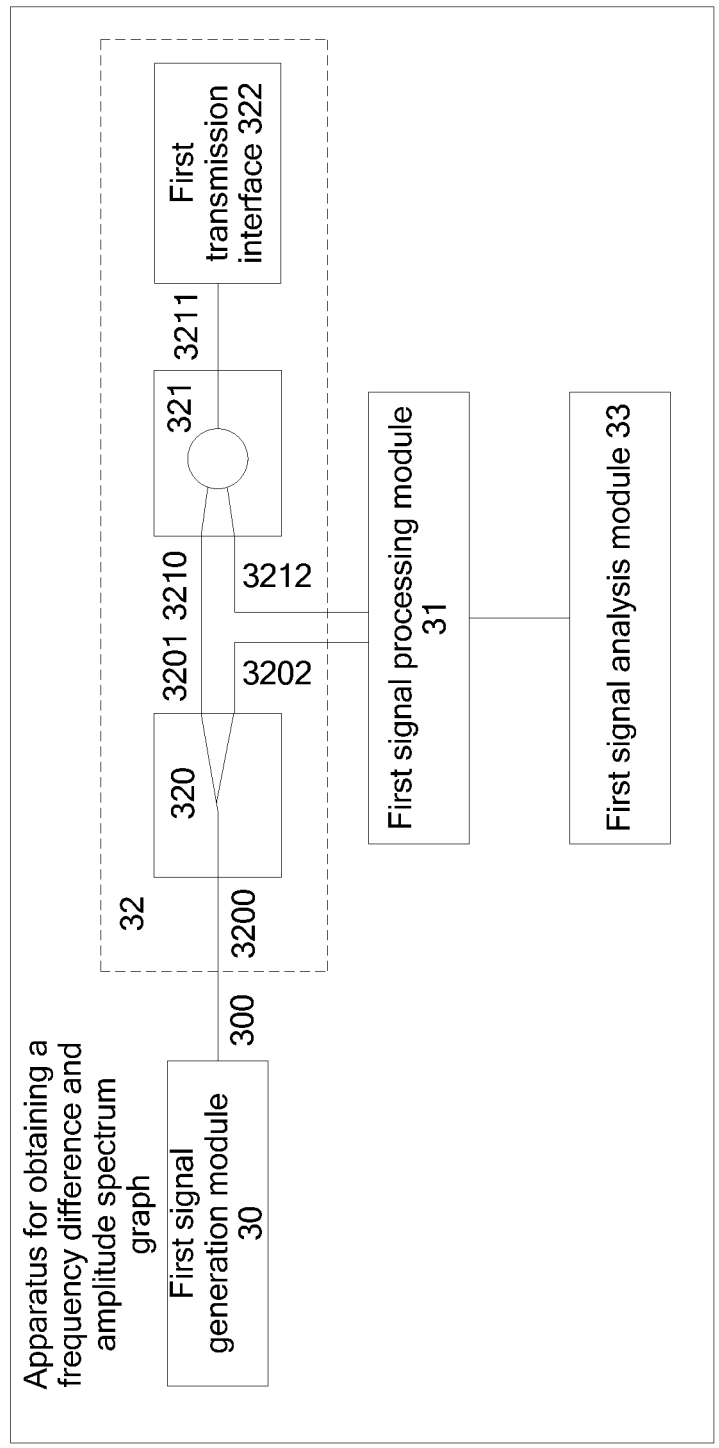
FIG. 10 is a schematic structural diagram 2 of another apparatus for obtaining a frequency difference and amplitude spectrum graph according to an embodiment of the present disclosure.

Optionally, with reference to FIG. 9, as shown in FIG. 10, in the apparatus for obtaining a frequency difference and amplitude spectrum graph provided in this embodiment of the present disclosure, the first signal transmission module 32 includes a first power splitter 320, a first circulator 321, and a first transmission interface 322. An input end 3200 of the first power splitter 320 is connected to an output end 300 of the first signal generation module 30, a first output end 3201 of the first power splitter 320 is connected to a first end 3210 of the first circulator 321, a second output end 3202 of the first power splitter 320 is connected to the first signal processing module 31, a second end 3211 of the first circulator 321 is connected to the first transmission interface 322, and a third end 3212 of the first circulator 321 is connected to the first signal processing module 31.

The first power splitter 320 is configured to receive, through the input end 3200 of the first power splitter 320, the detection signal sent by the first signal generation module 30, send the detection signal to the first circulator 321 through the first output end 3201 of the first power splitter 320, and send the detection signal to the first signal processing module 31 through the second output end 3202 of the first power splitter 320. The first circulator 321 is configured to receive, through the first end 3210 of the first circulator 321, the detection signal sent by the first power splitter 320, and send the detection signal to the first transmission interface 322 through the second end 3211 of the first circulator 321, where the detection signal is sent to the branch circuit through the first transmission interface 322; and receive, through the second end 3211 of the first circulator 321, the first echo signal returned by the branch circuit, and send the first echo signal to the first signal processing module 31 through the third end 3212 of the first circulator 321.

Optionally, in this embodiment of the present disclosure, the foregoing first transmission interface may be a cable, or may be a wireless module, such as a Wi-Fi module or an RF module.

In this embodiment of the present disclosure, the first power splitter may be configured to split the detection signal into two signals, and the first circulator may be configured to ensure that the first echo signal can return to the first circulator, where the first echo signal is obtained after the detection signal is reflected by the antenna node from which the detection signal is sent and by the K coupling nodes on the branch circuit. Therefore, the first signal processing module may superpose the detection signal and the first echo signal, and then send the superposed signal to the first signal analysis module for analysis.

Further, the detection signal is an incident wave signal, and the first echo signal is a signal obtained after the detection signal is reflected by the M coupling nodes on the main circuit, the antenna node from which the detection signal is sent, and the K coupling nodes on the branch circuit through which the detection signal passes in sequence. Therefore, the signal obtained after the detection signal and the first echo signal are superposed may be referred to as a first standing wave signal.

Figure 11:
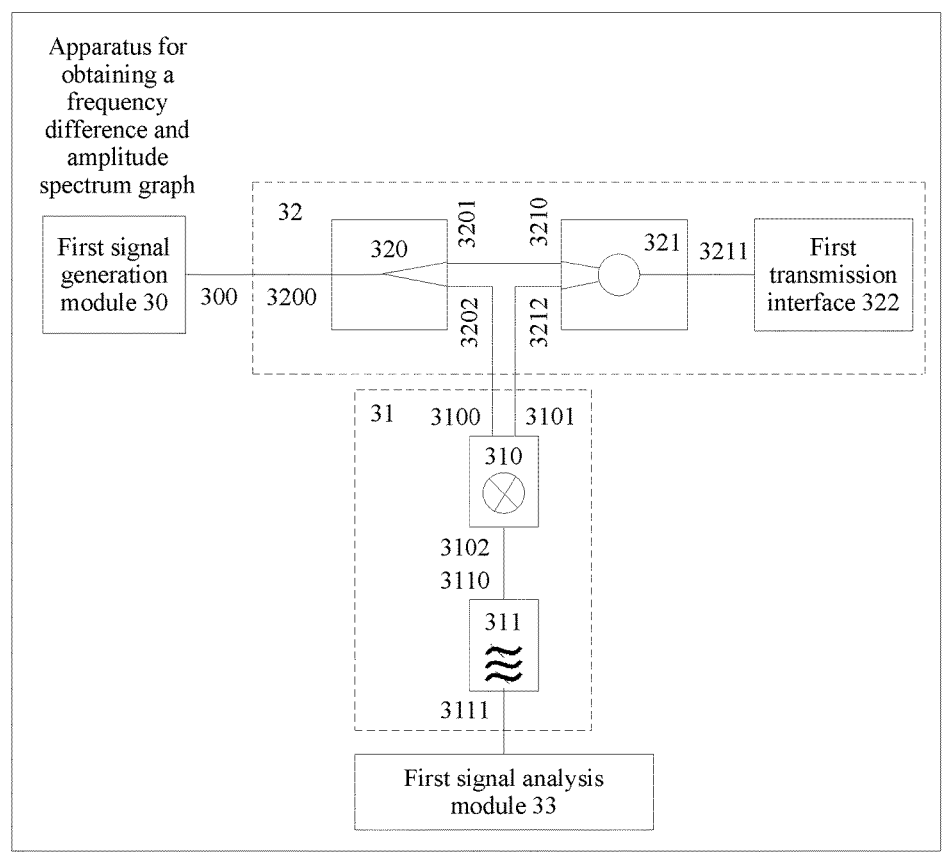
FIG. 11 is a schematic structural diagram 3 of another apparatus for obtaining a frequency difference and amplitude spectrum graph according to an embodiment of the present disclosure.

Optionally, with reference to FIG. 10, as shown in FIG. 11, in the apparatus for obtaining a frequency difference and amplitude spectrum graph provided in this embodiment of the present disclosure, the first signal processing module 31 includes a first frequency mixer 310 and a first filter 311. A first input end 3100 of the first frequency mixer 310 is connected to the second output end 3202 of the first power splitter 320, a second input end 3101 of the first frequency mixer 310 is connected to the third end 3212 of the first circulator 321, an output end 3102 of the first frequency mixer 310 is connected to an input end 3110 of the first filter 311, and an output end 3111 of the first filter 311 is connected to the first signal analysis module 33.

The first frequency mixer 310 is configured to superpose the detection signal and the first echo signal, and send the superposed signal to the first filter 311. The first filter 311 is configured to receive the superposed signal sent by the first frequency mixer 310, perform filtering on the superposed signal, and send the superposed signal on which filtering is performed to the first signal analysis module 33.

Optionally, in this embodiment of the present disclosure, the foregoing first filter may be a band-pass filter.

In this embodiment of the present disclosure, the first frequency mixer is configured to perform frequency mixing on the detection signal and the first echo signal, and may superpose the detection signal and the first echo signal, to obtain the corresponding first standing wave signal (that is, the superposed signal). Locations of a wave node and an antinode of the first standing wave signal are always constant. Therefore, a first frequency difference and amplitude spectrum graph obtained by using the first standing wave signal can relatively accurately indicate the correspondence between the location of each node of the M coupling nodes on the main circuit, the antenna node from which the detection signal is sent, and the K coupling nodes on the branch circuit and the amplitude of the first echo signal corresponding to the node. Therefore, when a fault occurs in the DAS, a fault source in the DAS can be accurately located.

Further, the superposed signal is filtered by using the first filter. This can suppress interference to the superposed signal caused by an interference signal.

Figure 12:
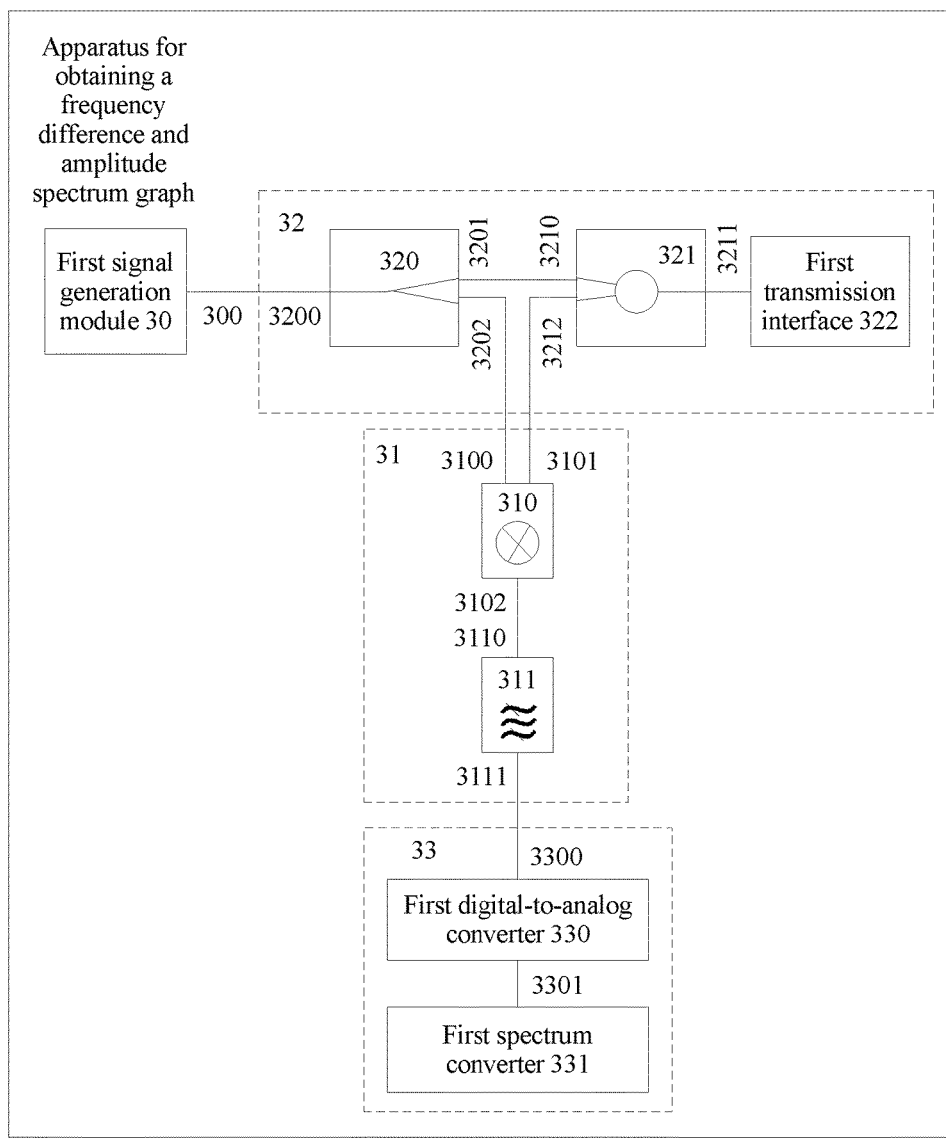
FIG. 12 is a schematic structural diagram 4 of another apparatus for obtaining a frequency difference and amplitude spectrum graph according to an embodiment of the present disclosure.

Optionally, with reference to FIG. 11, as shown in FIG. 12, in the apparatus for obtaining a frequency difference and amplitude spectrum graph provided in this embodiment of the present disclosure, the first signal analysis module 33 includes a first analog-to-digital converter 330 and a first spectrum converter 331. An input end 3300 of the first analog-to-digital converter 330 is connected to the output end 3111 of the first filter 311, and an output end 3301 of the first analog-to-digital converter 330 is connected to the first spectrum converter 331.

The first analog-to-digital converter 330 is configured to convert the superposed signal that is output by the first filter 311 and on which filtering is performed to a digital signal, and send the digital signal to the first spectrum converter 331. The first spectrum converter 331 is configured to receive the digital signal sent by the first analog-to-digital converter 330, and perform spectrum conversion on the digital signal to obtain the first frequency difference and amplitude spectrum graph.

In this embodiment of the present disclosure, the first analog-to-digital converter is configured to convert an analog signal to a digital signal, and perform spectrum conversion on the digital signal to obtain a corresponding first frequency difference and amplitude spectrum graph. This enables the first frequency difference and amplitude spectrum graph to accurately indicate the correspondence between the location of each node of the M coupling nodes on the main circuit, the antenna node from which the detection signal is sent, and the K coupling nodes on the branch circuit and the amplitude of the first echo signal corresponding to the node.

Figure 13:
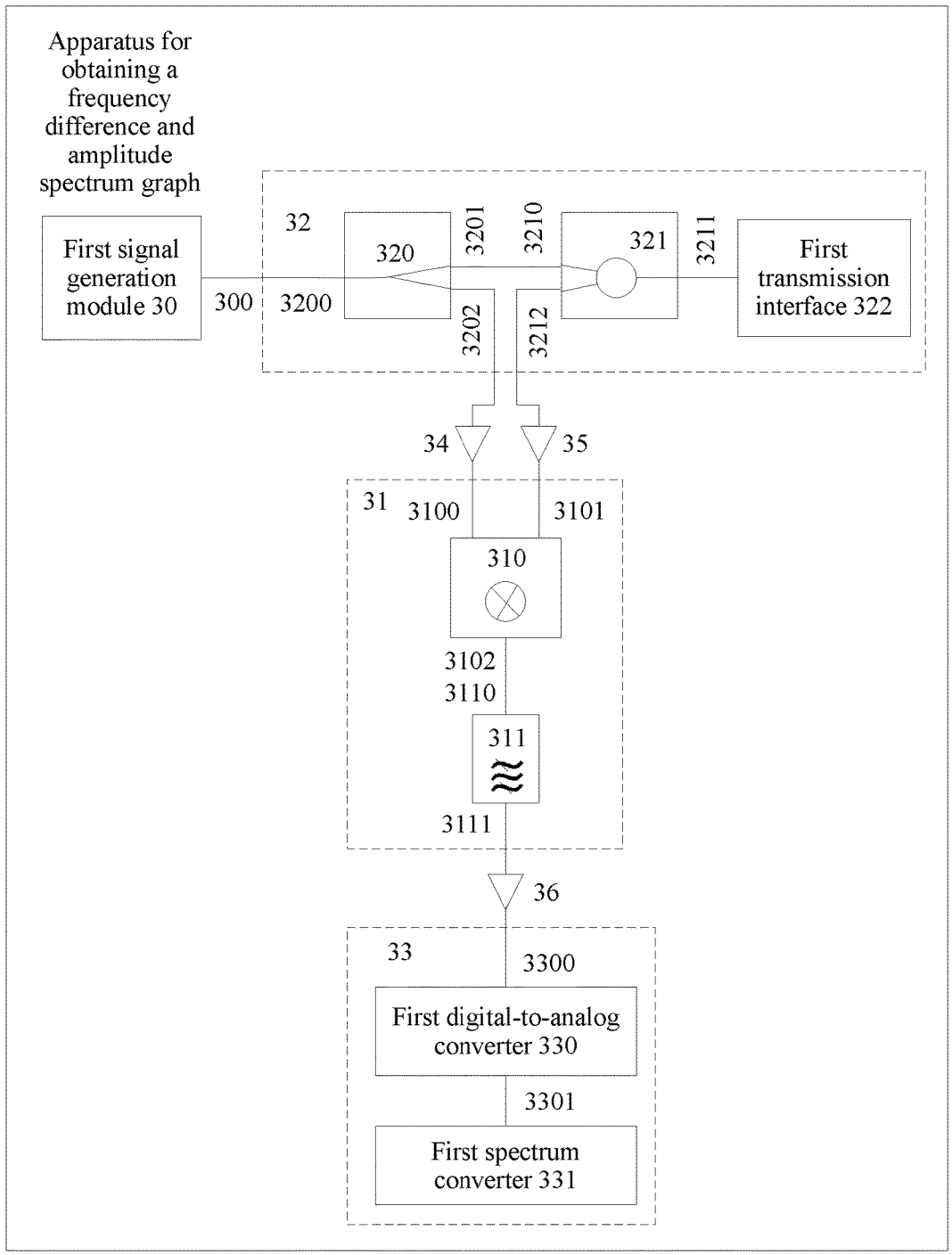
FIG. 13 is a schematic structural diagram 5 of another apparatus for obtaining a frequency difference and amplitude spectrum graph according to an embodiment of the present disclosure.

Optionally, with reference to FIG. 12, as shown in FIG. 13, the apparatus for obtaining a frequency difference and amplitude spectrum graph provided in this embodiment of the present disclosure further includes at least one of the following three amplifiers: a first amplifier 34 connected between the first input end 3100 of the first frequency mixer 310 and the second output end 3202 of the first power splitter 320, a second amplifier 35 connected between the second input end 3101 of the first frequency mixer 310 and the third end 3212 of the first circulator 321, or a third amplifier 36 connected between the input end 3300 of the first analog-to-digital converter 330 and the output end 3111 of the first filter 311.

The first amplifier 34 is configured to amplify the detection signal output through the second output end 3202 of the first power splitter 320, and send the amplified detection signal to the first frequency mixer 310. The second amplifier 35 is configured to amplify the first echo signal output through the third end 3212 of the first circulator 321, and send the amplified first echo signal to the first frequency mixer 310. The third amplifier 36 is configured to amplify the superposed signal that is output by the first filter 311 and on which filtering is performed, and send the amplified signal to the first analog-to-digital converter 330.

In this embodiment of the present disclosure, a signal strength of the detection signal may decrease in a transmission process (that is, the detection signal attenuates in the transmission process), and a signal strength of the first echo signal obtained after the detection signal is reflected is also relatively weak. Therefore, the first amplifier is configured to amplify the detection signal, to increase the signal strength of the detection signal; and the second amplifier is configured to amplify the first echo signal, to increase the signal strength of the first echo signal. In this way, a signal strength of the signal obtained by superposing the detection signal and the first echo signal by the apparatus for obtaining a frequency difference and amplitude spectrum graph can be relatively strong. This may further ensure that a first frequency difference and amplitude spectrum graph obtained, by using the superposed signal, by the apparatus for obtaining a frequency difference and amplitude spectrum graph is relatively accurate.

Further, after frequency mixing is performed by the first frequency mixer and filtering is performed by the first filter on the superposed signal, a signal strength of the superposed signal may be relatively weak. Therefore, the third amplifier is configured to amplify the superposed signal on which filtering is performed, to increase the signal strength of the superposed signal on which filtering is performed. This may ensure that the first frequency difference and amplitude spectrum graph obtained by the apparatus for obtaining a frequency difference and amplitude spectrum graph is more accurate.

Optionally, in this embodiment of the present disclosure, the foregoing detection signal may be a linear frequency-modulated continuous-wave signal.

For description of the linear frequency-modulated continuous-wave signal, refer to specific description of the linear frequency-modulated continuous-wave signal in the embodiment above. Details are not described herein again.

To better understand a specific implementation of this embodiment of the present disclosure, the following illustratively describes a principle by which the apparatus for obtaining a frequency difference and amplitude spectrum graph obtains a location of each node in the DAS.

Figure 14A:
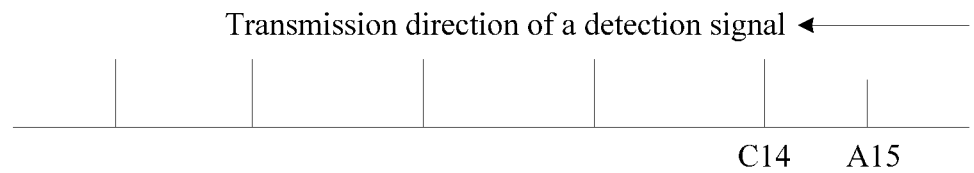
FIG. 14A is a schematic diagram 2 of a relative location of a node in a DAS according to an embodiment of the present disclosure.
Figure 14B:
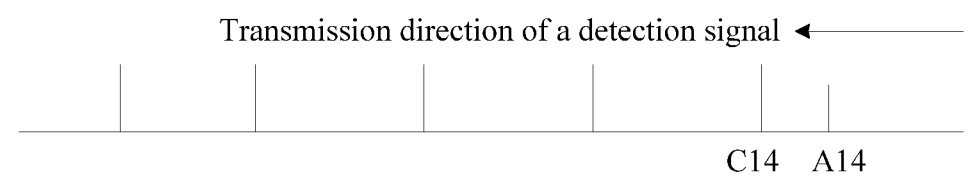
FIG. 14B is a schematic diagram 3 of a relative location of a node in a DAS according to an embodiment of the present disclosure.
Figure 14C:
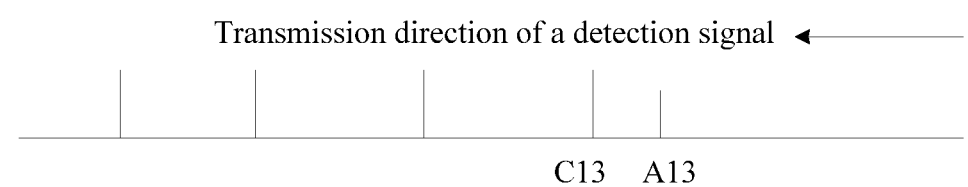
FIG. 14C is a schematic diagram 4 of a relative location of a node in a DAS according to an embodiment of the present disclosure.
Figure 14D:
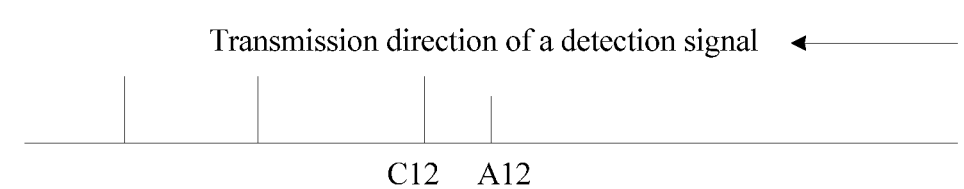
FIG. 14D is a schematic diagram 5 of a relative location of a node in a DAS according to an embodiment of the present disclosure.
Figure 14E:
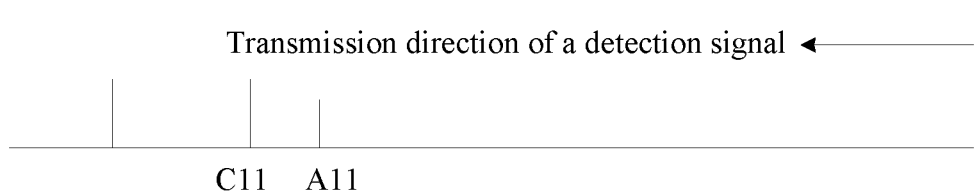
FIG. 14E is a schematic diagram 6 of a relative location of a node in a DAS according to an embodiment of the present disclosure.

For example, as shown in FIG. 14A, after sending a detection signal to a branch circuit 1 in a DAS through an antenna node A15 on the branch circuit 1, the apparatus for obtaining a frequency difference and amplitude spectrum graph may obtain, by using the foregoing principle of obtaining a distance to a test point from each node that reflects the detection signal, a schematic diagram of relative locations corresponding to the antenna node A15 on the branch circuit 1 in the DAS. The schematic diagram of relative locations represents distances from a coupling node on a main circuit, the antenna node A15 on the branch circuit 1, and each coupling node on the branch circuit 1 in the DAS to the test point. That is, the schematic diagram of relative locations represents relative locations of the coupling node on the main circuit, the antenna node A15 on the branch circuit 1, and each coupling node on the branch circuit 1 in the DAS. Each vertical line in FIG. 14A represents a node that reflects a detection signal. A location of the vertical line on a horizontal coordinate represents a relative location of the node to other nodes in the DAS, and a location of the vertical line on a vertical coordinate represents an amplitude of an echo signal obtained after the detection signal is reflected by the node.

Further, after sending a detection signal to the branch circuit 1 in the DAS through antenna nodes A14, A13, A12, and A11 on the branch circuit 1, the apparatus for obtaining a frequency difference and amplitude spectrum graph may obtain, by continuing to use the foregoing method of obtaining a distance to a test point from each node that reflects the detection signal, a schematic diagram of relative locations respectively corresponding to the antenna nodes on the branch circuit 1. For example, FIG. 14B, FIG. 14C, FIG. 14D, and FIG. 14E are respectively schematic diagrams of relative locations corresponding to the antenna nodes A14, A13, A12, and A11.

To facilitate better understanding of the principle by which the apparatus for obtaining a frequency difference and amplitude spectrum graph provided in this embodiment of the present disclosure obtains a location of each node in the DAS, the following illustratively describes a simulation result of a frequency difference and amplitude spectrum graph obtained by the apparatus for obtaining a frequency difference and amplitude spectrum graph by using the branch circuit 1 in the DAS shown in FIG. 1 as an example.

For specific description of a cable length between any antenna node or coupling node and a coupling node that is located before the antenna node or coupling node in FIG. 1, refer to related description of the cable lengths between the nodes in FIG. 1 in the embodiment above. Details are not described herein again.

Figure 15A:
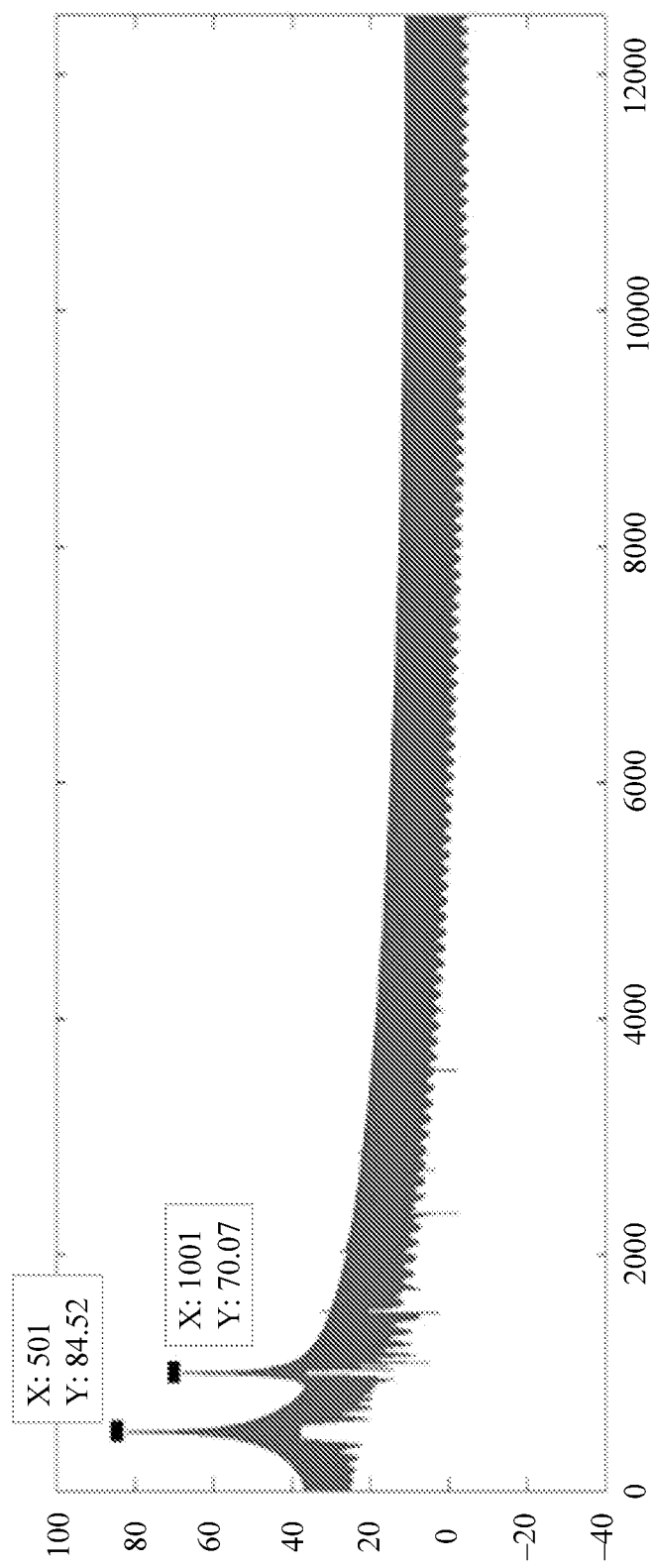
FIG. 15A is a simulation diagram 1 of a first frequency difference and amplitude spectrum graph according to an embodiment of the present disclosure.

Based on the foregoing cable length between any antenna node or coupling node and a coupling node that is located before the antenna node or coupling node, FIG. 15A shows a simulation diagram of a first frequency difference and amplitude spectrum graph that is obtained after an apparatus for obtaining a frequency difference and amplitude spectrum graph sends a detection signal to a branch circuit 1 through an antenna node A11 on the branch circuit 1 and that is corresponding to the antenna node A11 (where the simulation diagram may be considered as a first frequency difference and amplitude spectrum graph corresponding to the antenna node A11 in the DAS when there is no faulty node in the DAS).

Figure 15B:
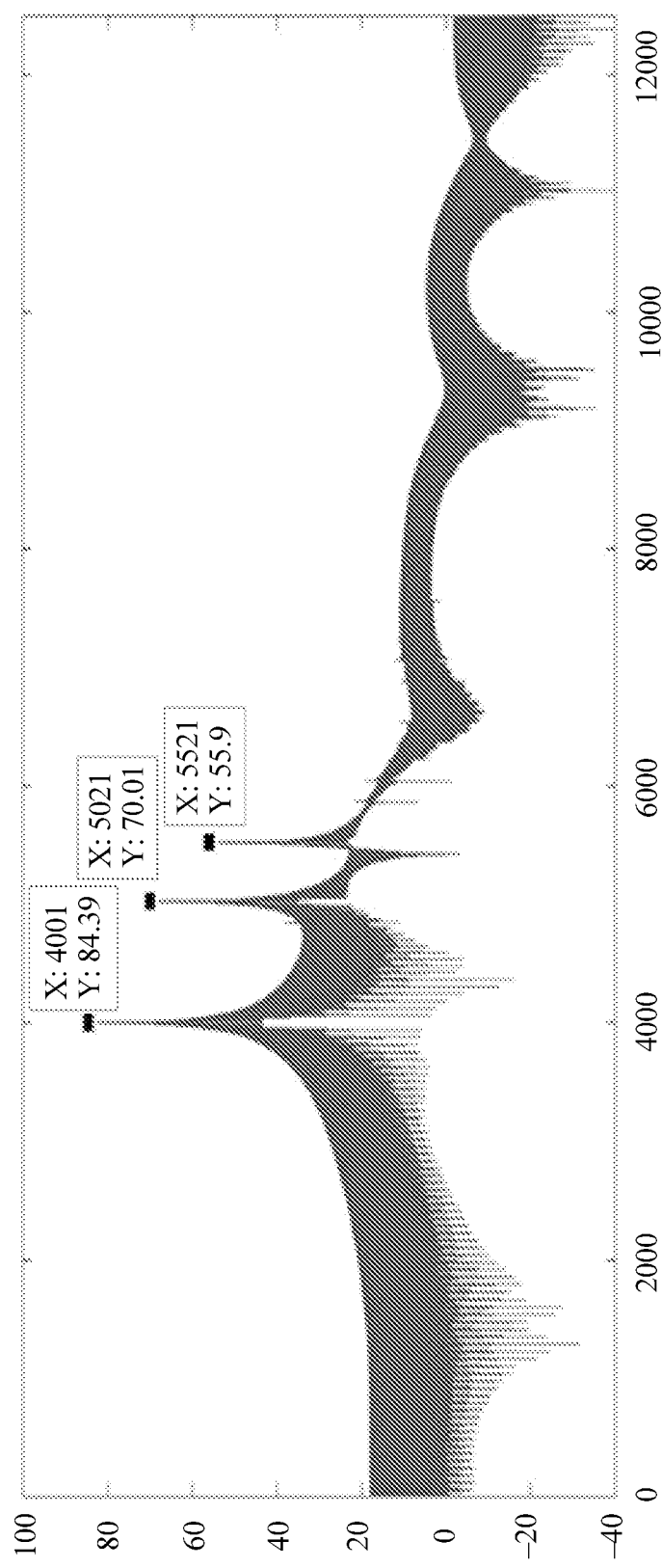
FIG. 15B is a simulation diagram 2 of a first frequency difference and amplitude spectrum graph according to an embodiment of the present disclosure.

FIG. 15B shows a simulation diagram of a first frequency difference and amplitude spectrum graph that is obtained after an apparatus for obtaining a frequency difference and amplitude spectrum graph sends a detection signal to a branch circuit 1 through an antenna node A12 on the branch circuit 1 and that is corresponding to the antenna node A12 (where the simulation diagram may be considered as a first frequency difference and amplitude spectrum graph corresponding to the antenna node A12 in the DAS when there is no faulty node in the DAS).

Figure 15C:
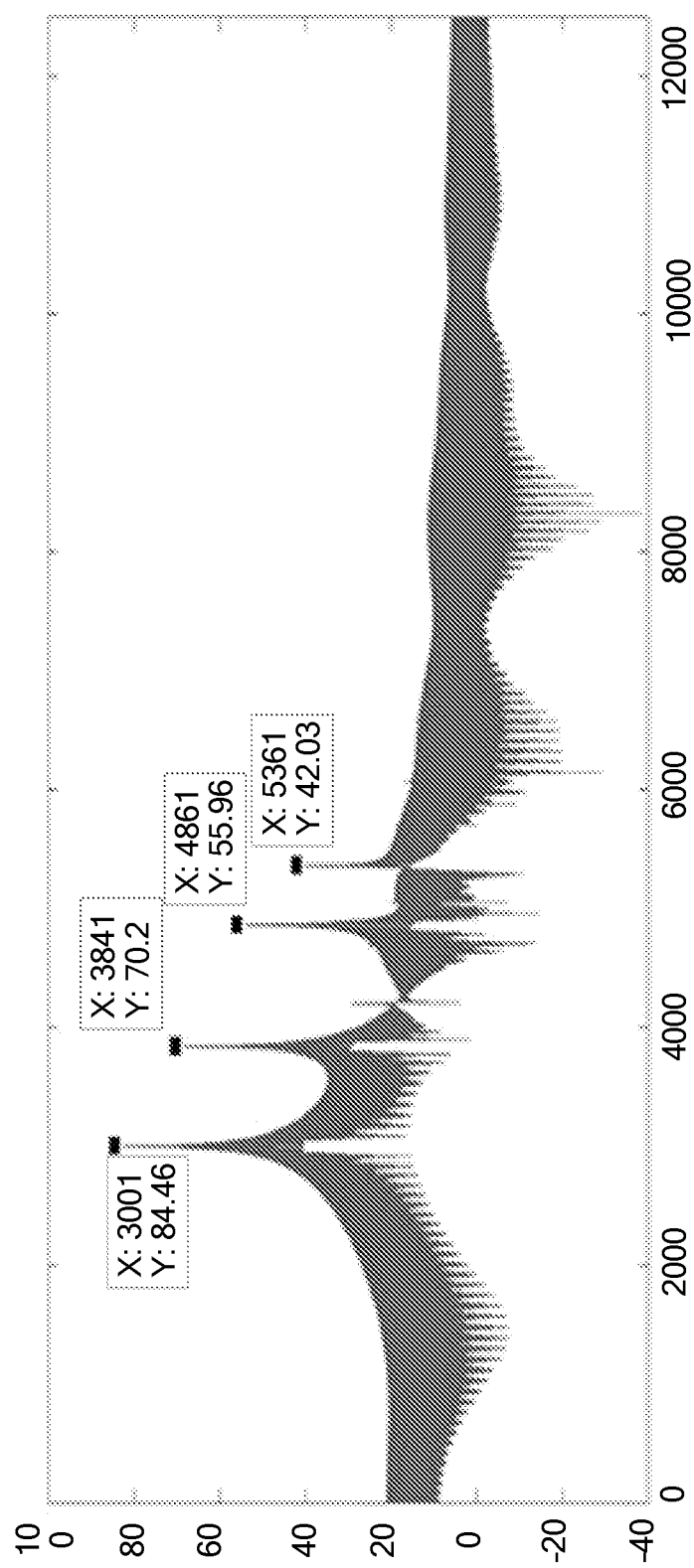
FIG. 15C is a simulation diagram 3 of a first frequency difference and amplitude spectrum graph according to an embodiment of the present disclosure.

FIG. 15C shows a simulation diagram of a first frequency difference and amplitude spectrum graph that is obtained after an apparatus for obtaining a frequency difference and amplitude spectrum graph sends a detection signal to a branch circuit 1 through an antenna node A13 on the branch circuit 1 and that is corresponding to the antenna node A13 (where the simulation diagram may be considered as a first frequency difference and amplitude spectrum graph corresponding to the antenna node A13 in the DAS when there is no faulty node in the DAS).

Figure 15D:
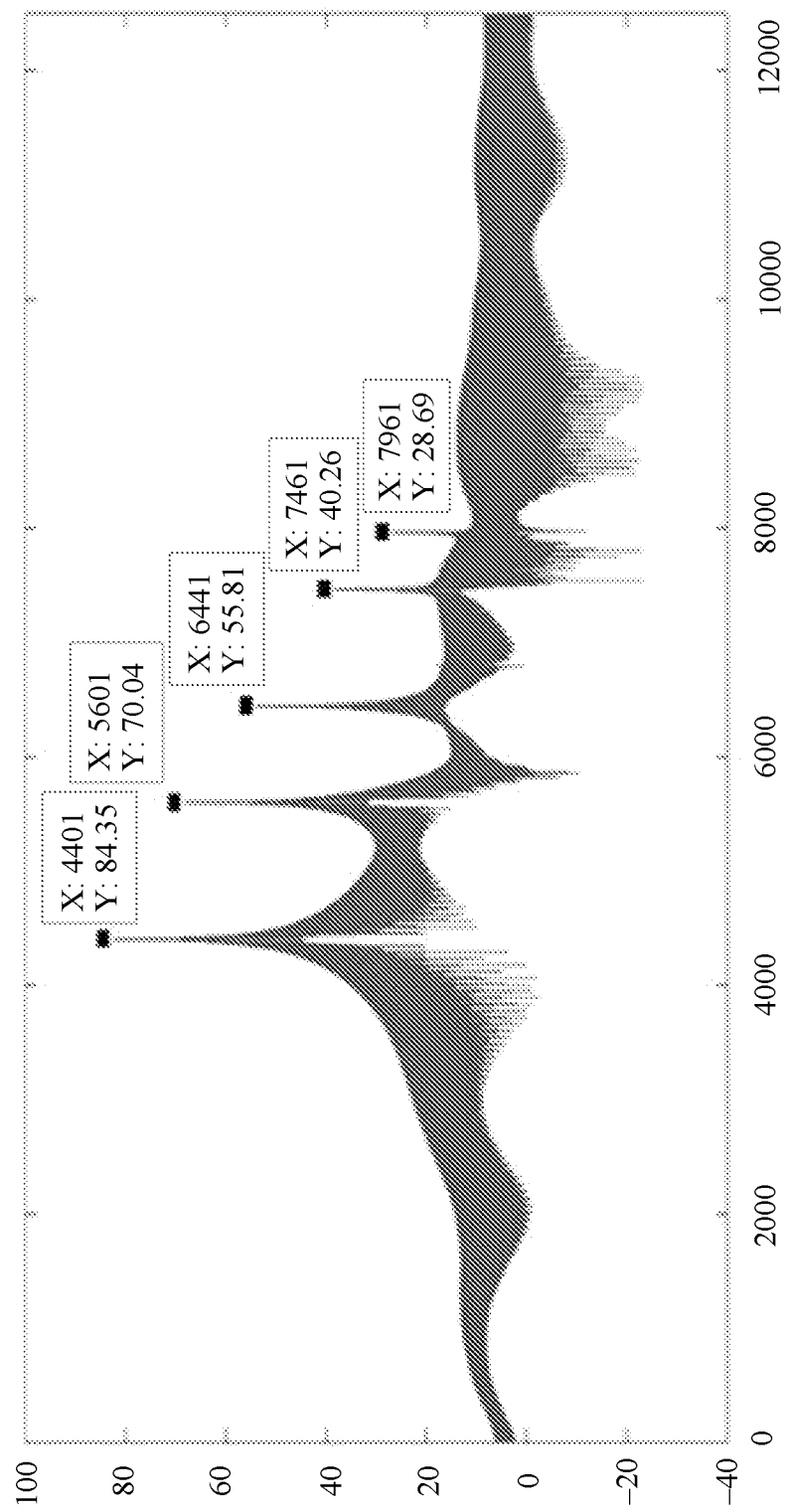
FIG. 15D is a simulation diagram 4 of a first frequency difference and amplitude spectrum graph according to an embodiment of the present disclosure.

FIG. 15D shows a simulation diagram of a first frequency difference and amplitude spectrum graph that is obtained after an apparatus for obtaining a frequency difference and amplitude spectrum graph sends a detection signal to a branch circuit 1 through an antenna node A14 on the branch circuit 1 and that is corresponding to the antenna node A14 (where the simulation diagram may be considered as a first frequency difference and amplitude spectrum graph corresponding to the antenna node A14 in the DAS when there is no faulty node in the DAS).

Figure 15E:
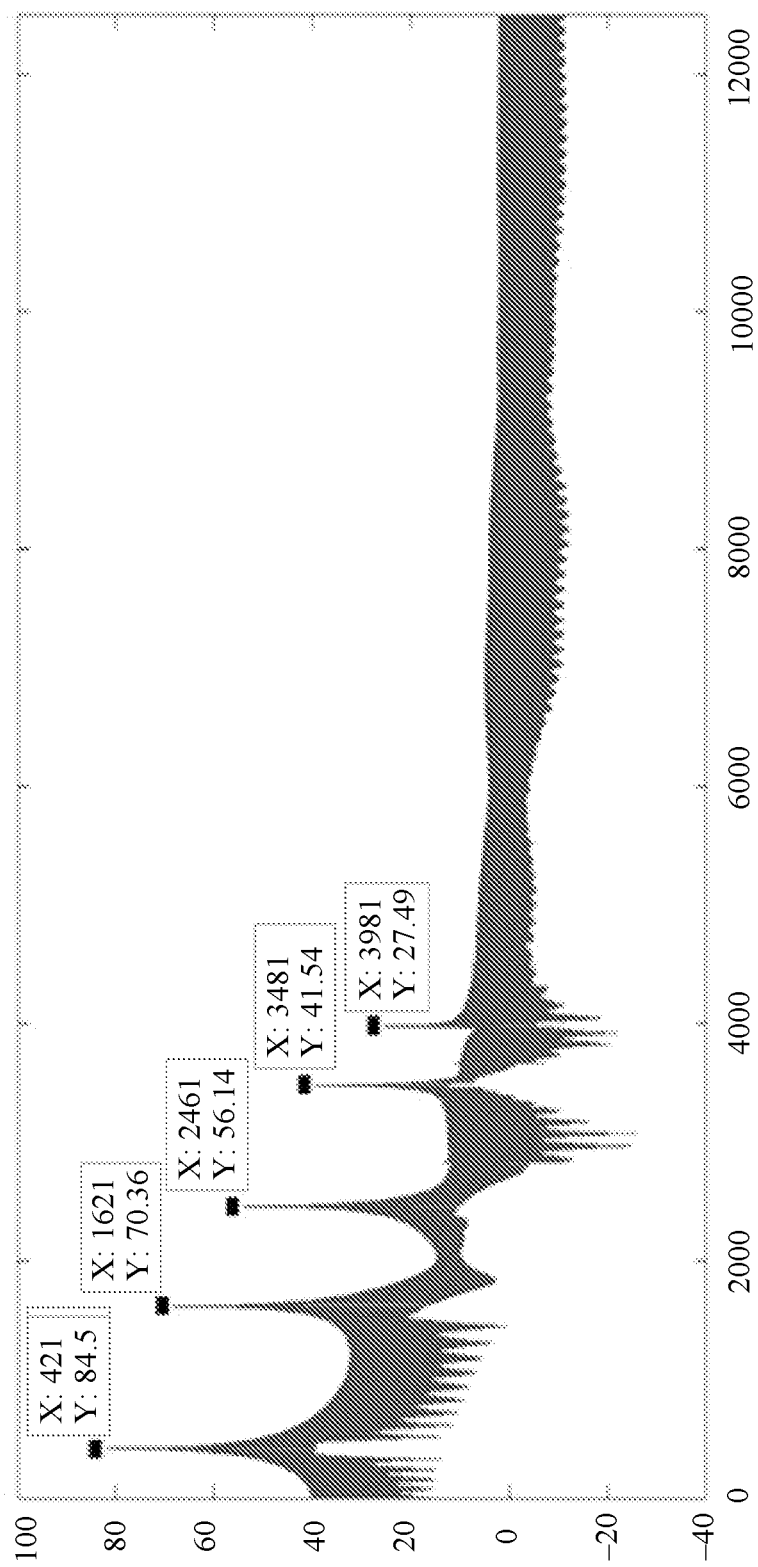
FIG. 15E is a simulation diagram 5 of a first frequency difference and amplitude spectrum graph according to an embodiment of the present disclosure.

FIG. 15E shows a simulation diagram of a first frequency difference and amplitude spectrum graph that is obtained after an apparatus for obtaining a frequency difference and amplitude spectrum graph sends a detection signal to a branch circuit 1 through an antenna node A15 on the branch circuit 1 and that is corresponding to the antenna node A15 (where the simulation diagram may be considered as a first frequency difference and amplitude spectrum graph corresponding to the antenna node A15 in the DAS when there is no faulty node in the DAS).

In this way, the apparatus for obtaining a frequency difference and amplitude spectrum graph in this embodiment may obtain the first frequency difference and amplitude spectrum graph corresponding to each antenna node on the branch circuit 1. The first frequency difference and amplitude spectrum graphs shown in FIG. 15A to FIG. 15E are used to indicate a correspondence between a location of each node of the coupling node on the main circuit, an antenna node (such as A11, A12, A13, A14, and A15) that is on the branch circuit 1 and that sends a detection signal, and all coupling nodes on the branch circuit 1 in the DAS and an amplitude of a first echo signal corresponding to the node.

It should be noted that, in this embodiment of the present disclosure, the foregoing schematic diagrams of the relative locations corresponding to the antenna nodes shown in FIG. 14A to FIG. 14E are similar to the first frequency difference and amplitude spectrum graphs obtained through simulation shown in FIG. 15A to FIG. 15E. The foregoing schematic diagrams of the relative locations corresponding to the antenna nodes shown in FIG. 14A to FIG. 14E are merely simplified diagrams, that is, theoretical schematic diagrams, of first frequency difference and amplitude spectrum graphs that are obtained through simulation for more clearly describing the principle, provided in this embodiment of the present disclosure, of obtaining a frequency difference and amplitude spectrum graph. Frequency difference and amplitude spectrum graphs actually obtained by the apparatus for obtaining a frequency difference and amplitude spectrum graph are all like the first frequency difference and amplitude spectrum graphs shown in FIG. 15A to FIG. 15E.

Optionally, in the foregoing embodiment of the present disclosure, only one branch circuit in the DAS is used as an example. That is, the branch circuit 1 in the DAS shown in FIG. 1 is used as an example for illustrative description. For another branch circuit (such as the branch circuit 2 shown in FIG. 1) in the DAS, a method by which the apparatus for obtaining a frequency difference and amplitude spectrum graph obtains a first frequency difference and amplitude spectrum graph is the same as the foregoing method of obtaining the first frequency difference and amplitude spectrum graphs of the antenna nodes on the branch circuit 1 in the DAS. For details, refer to related description in the embodiments shown in FIG. 14A to FIG. 14E and FIG. 15A to FIG. 15E. Details are not described herein again.

An embodiment of the present disclosure provides a fault location system. The fault location system may be applied to a DAS, and the DAS includes one main circuit and multiple branch circuits. The main circuit includes M coupling nodes, and each branch circuit includes N antenna nodes and K coupling nodes, where M, N, and K are all positive integers. The DAS may be the foregoing DAS shown in FIG. 1. Specifically, for description of the DAS, refer to related description of the DAS in the embodiment shown in FIG. 1. Details are not described herein again.

Figure 16:
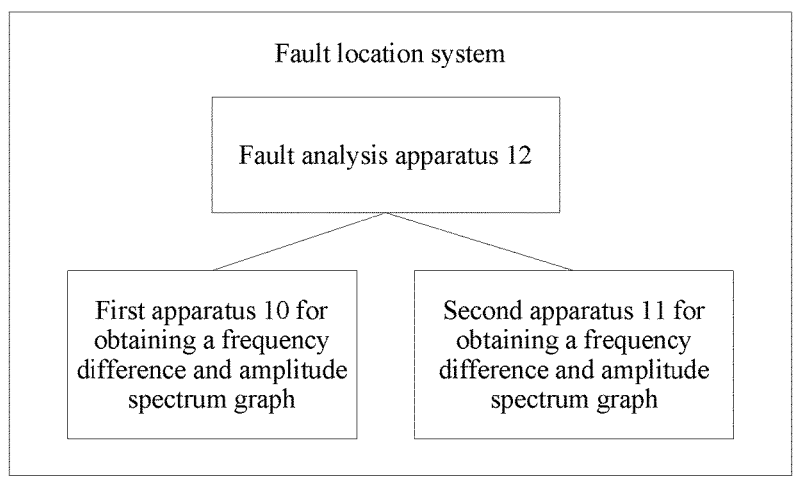
FIG. 16 is a schematic architectural diagram of a fault location system according to an embodiment of the present disclosure.

As shown in FIG. 16, the fault location system includes a first apparatus 10 for obtaining a frequency difference and amplitude spectrum graph, a second apparatus 11 for obtaining a frequency difference and amplitude spectrum graph, and a fault analysis apparatus 12 connected to both the first apparatus 10 for obtaining a frequency difference and amplitude spectrum graph and the second apparatus 11 for obtaining a frequency difference and amplitude spectrum graph.

The first apparatus 10 for obtaining a frequency difference and amplitude spectrum graph may be the apparatus for obtaining a frequency difference and amplitude spectrum graph shown in any one of FIG. 2 to FIG. 6 in the embodiments above. The second apparatus 11 for obtaining a frequency difference and amplitude spectrum graph may be the apparatus for obtaining a frequency difference and amplitude spectrum graph shown in any one of FIG. 9 to FIG. 13 in the embodiments above. The fault analysis apparatus 12 is configured to: for each of at least one branch circuit of the multiple branch circuits in the DAS, and for at least one first frequency difference and amplitude spectrum graph of N first frequency difference and amplitude spectrum graphs that are sent by the second apparatus for obtaining a frequency difference and amplitude spectrum graph and that are corresponding to the N antenna nodes on the branch circuit, mutually verify each of the at least one first frequency difference and amplitude spectrum graph and a frequency difference and amplitude spectrum graph sent by the first apparatus for obtaining a frequency difference and amplitude spectrum graph; determine, in the frequency difference and amplitude spectrum graph, a location of each antenna node shown in the first frequency difference and amplitude spectrum graph and a location of a coupling node in the vicinity of at least one of the antenna nodes; and determine, in the frequency difference and amplitude spectrum graph, a location of at least one of the M coupling nodes on the main circuit and locations of at least one antenna node and at least one coupling node on the branch circuit.

In the fault location system provided in this embodiment of the present disclosure, the first apparatus for obtaining a frequency difference and amplitude spectrum graph is configured to obtain the frequency difference and amplitude spectrum graph; the second apparatus for obtaining a frequency difference and amplitude spectrum graph is configured to obtain the N first frequency difference and amplitude spectrum graphs; and the fault analysis apparatus is configured to mutually verify each of at least one first frequency difference and amplitude spectrum graph of the N first frequency difference and amplitude spectrum graphs and the frequency difference and amplitude spectrum graph, and determine, in the frequency difference and amplitude spectrum graph, the location of at least one of the M coupling nodes on the main circuit and the locations of at least one antenna node and at least one coupling node on the branch circuit, thereby determining, in the frequency difference and amplitude spectrum graph, locations of the M coupling nodes on the main circuit and the N antenna nodes and the K coupling nodes on the branch circuit. When a fault occurs in the DAS, the fault location system may locate a faulty node in the DAS by analyzing the frequency difference and amplitude spectrum graph on which the locations of the nodes are determined, thereby accurately locating a fault source in the DAS.

In this embodiment of the present disclosure, for specific description of the first apparatus 10 for obtaining a frequency difference and amplitude spectrum graph, refer to related description of the apparatus for obtaining a frequency difference and amplitude spectrum graph in the embodiment shown in any one of FIG. 2 to FIG. 6. Details are not described herein again. For specific description of the second apparatus 11 for obtaining a frequency difference and amplitude spectrum graph, refer to related description of the apparatus for obtaining a frequency difference and amplitude spectrum graph in the embodiment shown in any one of FIG. 9 to FIG. 13. Details are not described herein again.

In this embodiment of the present disclosure, the first apparatus 10 for obtaining a frequency difference and amplitude spectrum graph may be disposed at a signal input end of the DAS. For example, the first apparatus 10 for obtaining a frequency difference and amplitude spectrum graph may be disposed between the signal input end and C00 shown in FIG. 1, and the first apparatus 10 for obtaining a frequency difference and amplitude spectrum graph and the signal input end are connected to C00 by using a combiner. The second apparatus 11 for obtaining a frequency difference and amplitude spectrum graph may be independent from the DAS. That is, the second apparatus 11 for obtaining a frequency difference and amplitude spectrum graph may be an independent detection device or a removable detection device. The fault analysis apparatus 12 may be an independent host, and may be implemented by running a corresponding computer program or computer instruction in the host. Certainly, alternatively, the fault analysis apparatus 12 may be integrated in a same host or detection device as the first apparatus 10 for obtaining a frequency difference and amplitude spectrum graph for implementation. Specifically, specific implementation of the first apparatus 10 for obtaining a frequency difference and amplitude spectrum graph, the second apparatus 11 for obtaining a frequency difference and amplitude spectrum graph, and the fault analysis apparatus 12 may be determined according to an actual use requirement. This embodiment of the present disclosure sets no specific limitation.

Figure 17:
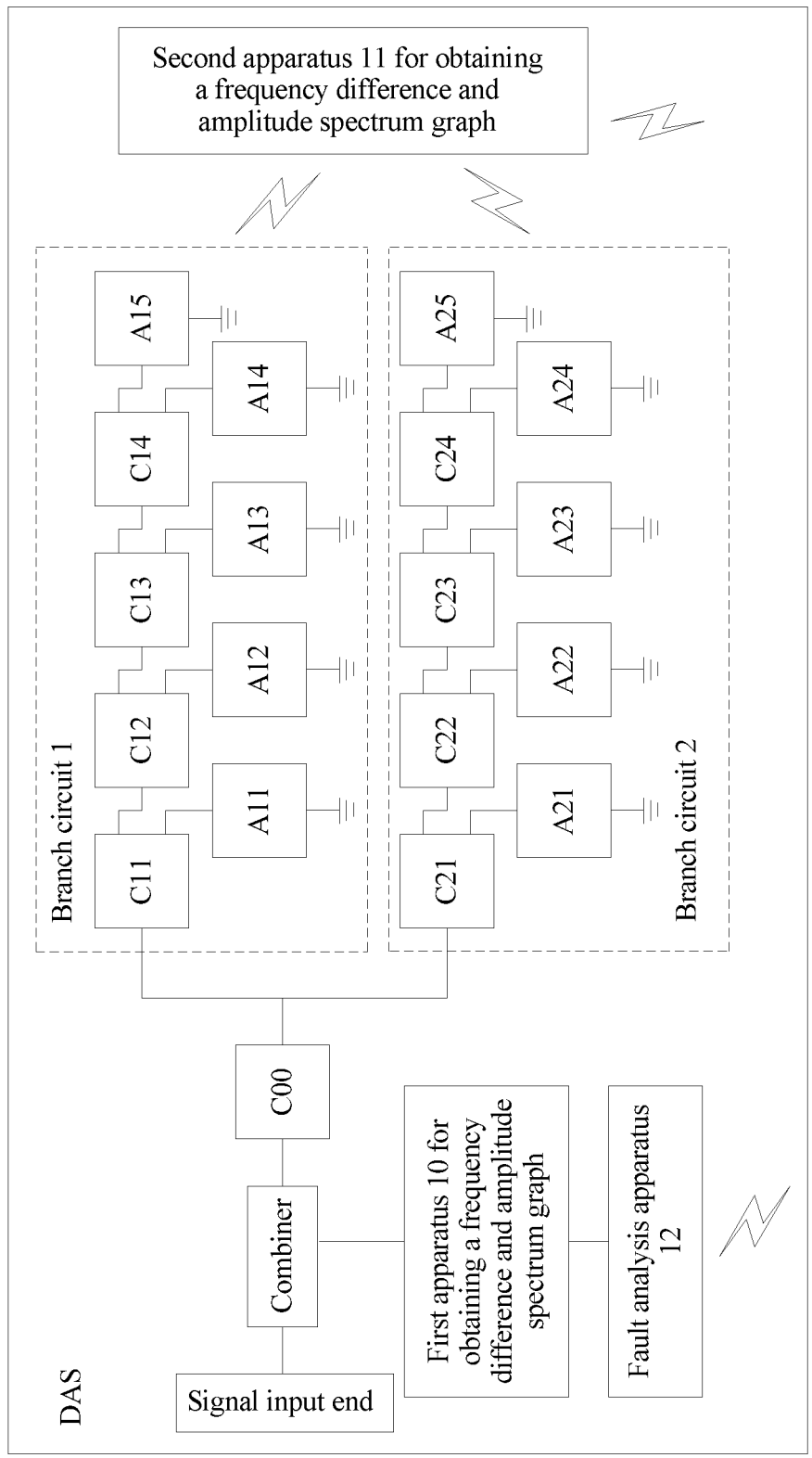
FIG. 17 is a schematic architectural diagram of a DAS to which a fault location system is applied according to an embodiment of the present disclosure.

FIG. 17 shows a schematic architectural diagram of a DAS to which a fault location system is applied according to an embodiment of the present disclosure. In FIG. 17, illustrative description is provided only by using an example in which a first apparatus 10 for obtaining a frequency difference and amplitude spectrum graph is disposed between a signal input end and C00 in the DAS, a second apparatus 11 for obtaining a frequency difference and amplitude spectrum graph is a removable detection device, and a fault analysis apparatus 12 is an independent host. In FIG. 17, the second apparatus 11 for obtaining a frequency difference and amplitude spectrum graph is wirelessly connected to each of a branch circuit 1, a branch circuit 2, and the fault analysis apparatus 12. The first apparatus 10 for obtaining a frequency difference and amplitude spectrum graph and the fault analysis apparatus 12 may be connected in a wired manner (for example, connected by using a cable) or may be connected in a wireless manner. A specific connection manner may be determined according to an actual use requirement. This embodiment of the present disclosure sets no specific limitation.

Based on the schematic architectural diagram shown in FIG. 17, a specific process in which the first apparatus 10 for obtaining a frequency difference and amplitude spectrum graph, the second apparatus 11 for obtaining a frequency difference and amplitude spectrum graph, and the fault analysis apparatus 12 locate a fault on each branch circuit in the DAS may specifically include the following:

Using one branch circuit in the DAS as an example, the first apparatus 10 for obtaining a frequency difference and amplitude spectrum graph sends the fault analysis apparatus 12 a frequency difference and amplitude spectrum graph, of the branch circuit, obtained by the first apparatus 10 for obtaining a frequency difference and amplitude spectrum graph. The second apparatus 11 for obtaining a frequency difference and amplitude spectrum graph sends, to the fault analysis apparatus 12, N first frequency difference and amplitude spectrum graphs that are corresponding to the N antenna nodes on the branch circuit and that are obtained by the second apparatus 11 for obtaining a frequency difference and amplitude spectrum graph. The fault analysis apparatus 12 mutually verifies each of at least one first frequency difference and amplitude spectrum graph of the N first frequency difference and amplitude spectrum graphs and the frequency difference and amplitude spectrum graph sent by the first apparatus for obtaining a frequency difference and amplitude spectrum graph, and determines, in the frequency difference and amplitude spectrum graph, a location of each antenna node shown in the first frequency difference and amplitude spectrum graph and a location of a coupling node in the vicinity of at least one of the antenna nodes, thereby determining, in the frequency difference and amplitude spectrum graph, a location of at least one of the M coupling nodes on the main circuit and locations of at least one antenna node and at least one coupling node on the branch circuit. In this way, when a fault occurs in the DAS, the fault location system may locate a faulty node in the DAS by analyzing the frequency difference and amplitude spectrum graph on which the locations of the nodes are determined, thereby accurately locating a fault source in the DAS.

It should be noted that, in FIG. 17, illustrative description is provided by using an example in which the DAS includes two branch circuits, the main circuit in the DAS includes one coupling node, and each branch circuit includes five antenna nodes and four coupling nodes. Cases in which the DAS includes more branch circuits, or the main circuit in the DAS includes more coupling nodes, and each branch circuit includes more antenna nodes and coupling nodes are similar to FIG. 17, and are not listed one by one in this embodiment of the present disclosure. For specific description of the DAS shown in FIG. 17, refer to related description of the DAS shown in FIG. 1. Details are not described herein again.

Figure 18:
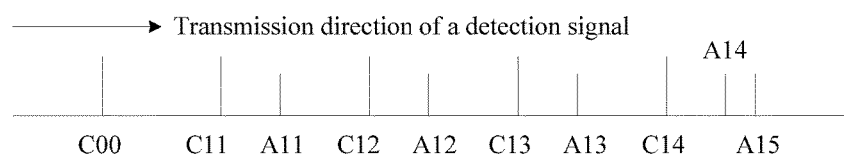
FIG. 18 is a schematic diagram 2 of a relative location of a node in a DAS according to an embodiment of the present disclosure.

Further, in this embodiment of the present disclosure, after the first apparatus for obtaining a frequency difference and amplitude spectrum graph obtains the foregoing relative locations shown in FIG. 7, and the second apparatus for obtaining a frequency difference and amplitude spectrum graph obtains the foregoing relative locations shown in FIG. 14A to FIG. 14E, the first apparatus for obtaining a frequency difference and amplitude spectrum graph and the second apparatus for obtaining a frequency difference and amplitude spectrum graph may send these relative locations to the fault analysis apparatus. Then, the fault analysis apparatus may mutually verify a project construction drawing of the DAS and the relative locations shown in FIG. 7 and FIG. 14A to FIG. 14E, to determine the nodes in the DAS shown in FIG. 7, that is, determine a node represented by a vertical line in FIG. 7. For example, as shown in FIG. 18, it can be determined that the vertical lines in FIG. 7 are C00, C11, A11, C12, A12, C13, A13, C14, A14, and A15 in sequence from left to right. In this way, the fault analysis apparatus may determine physical locations, in the DAS, of the coupling node on the main circuit and the antenna nodes and the coupling nodes on each branch circuit in the DAS, and relative locations of these nodes. Therefore, the fault analysis apparatus can determine a cable (also referred to as a feeder) length between any two nodes of these nodes. Further, the fault analysis apparatus can depict a topology structure of the DAS according to the physical locations of these nodes in the DAS and the cable length between any two nodes.

A person skilled in the art may understand that the topology structure of the DAS depicted by the fault analysis apparatus is a real topology structure of the DAS. There may be some differences between the topology structure and the project construction drawing of the DAS. The fault analysis apparatus may accurately determine a faulty node on each branch circuit in the DAS with reference to the real topology structure of the DAS, thereby improving fault location accuracy.

Figure 19:
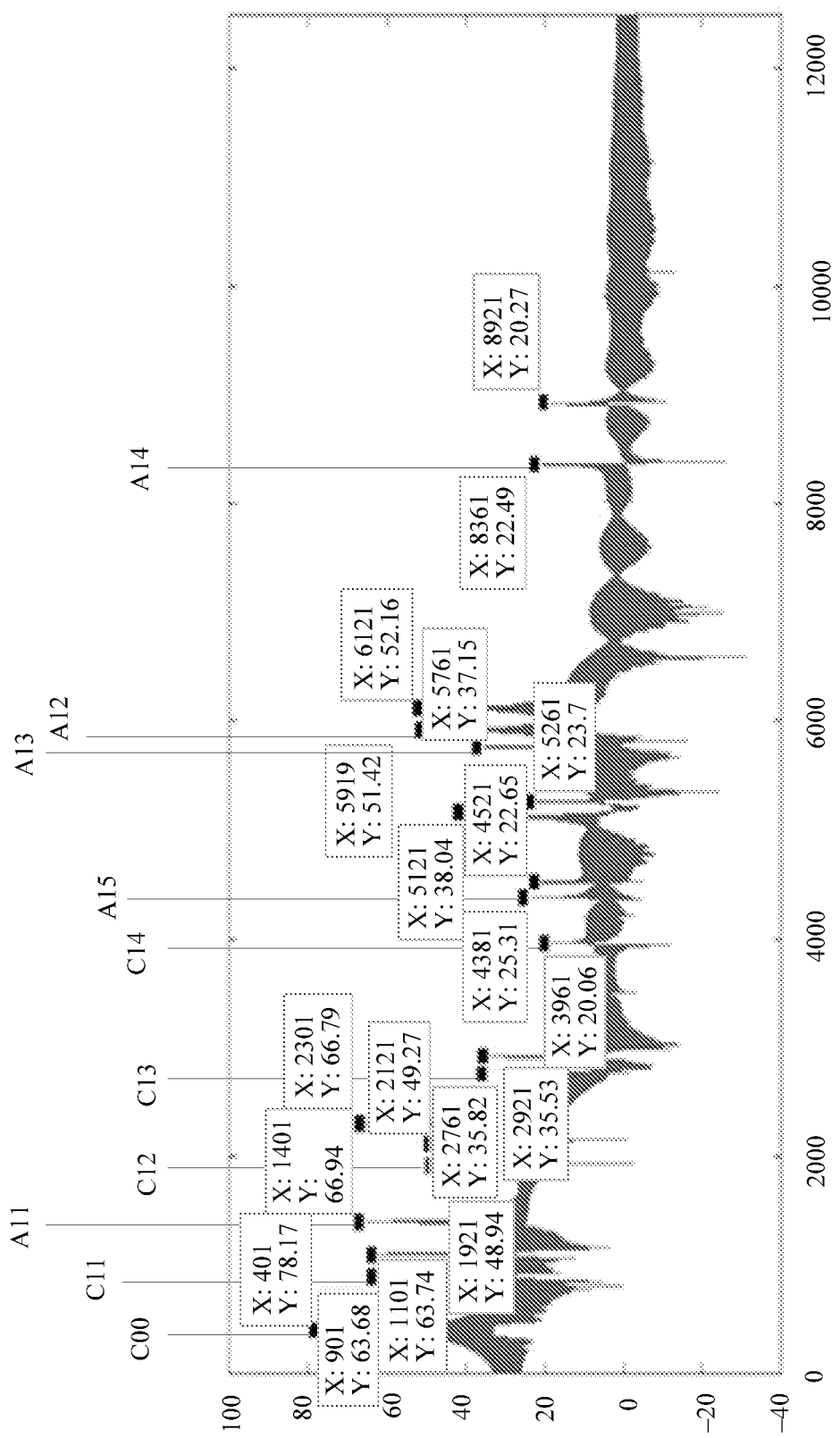
FIG. 19 is a simulation diagram 2 of a frequency difference and amplitude spectrum graph according to an embodiment of the present disclosure.

Further, in this embodiment of the present disclosure, after the first apparatus for obtaining a frequency difference and amplitude spectrum graph obtains the foregoing frequency difference and amplitude spectrum graph shown in FIG. 8, and the second apparatus for obtaining a frequency difference and amplitude spectrum graph obtains the foregoing first frequency difference and amplitude spectrum graphs shown in FIG. 15A to FIG. 15E, the first apparatus for obtaining a frequency difference and amplitude spectrum graph and the second apparatus for obtaining a frequency difference and amplitude spectrum graph may send these frequency difference and amplitude spectrum graphs to the fault analysis apparatus. The fault analysis apparatus mutually verifies these frequency difference and amplitude spectrum graphs; and determines, in the frequency difference and amplitude spectrum graph shown in FIG. 8, locations of a coupling node C00 on the main circuit, antenna nodes A11, A12, A13, A14, and A15 on the branch circuit 1, and coupling nodes C11, C12, C13, and C14 on the branch circuit 1, as shown in FIG. 19. In this way, when a fault occurs on an antenna node on the branch circuit 1, the fault analysis apparatus can determine the faulty antenna node on the branch circuit 1 by analyzing the frequency difference and amplitude spectrum graph on which the locations of the nodes are determined.

Optionally, in the foregoing embodiment of the present disclosure, only one branch circuit in the DAS is used as an example. That is, a branch circuit 1 in the DAS is used as an example to describe in detail a method and a principle by which the fault location system provided in this embodiment of the present disclosure locates a fault source on the branch circuit 1. A method and a principle by which the fault location system locates a fault source on another branch circuit (such as the branch circuit 2 shown in FIG. 1 or FIG. 3) in the DAS are both the same as the method and the principle by which the fault location system locates a fault source on the branch circuit 1. For details, refer to related description of the method and the principle by which the fault location system locates a fault source on the branch circuit 1 in the foregoing embodiment. Details are not described herein again.

An embodiment of the present disclosure provides a fault location system. The fault location system is applied to a DAS, and the DAS includes one main circuit and multiple branch circuits. The main circuit includes M coupling nodes, and each branch circuit includes N antenna nodes and K coupling nodes, where M, N, and K are all positive integers. Specifically, for description of the DAS, refer to related description of the DAS in the embodiment shown in FIG. 1. Details are not described herein again.

Figure 20:
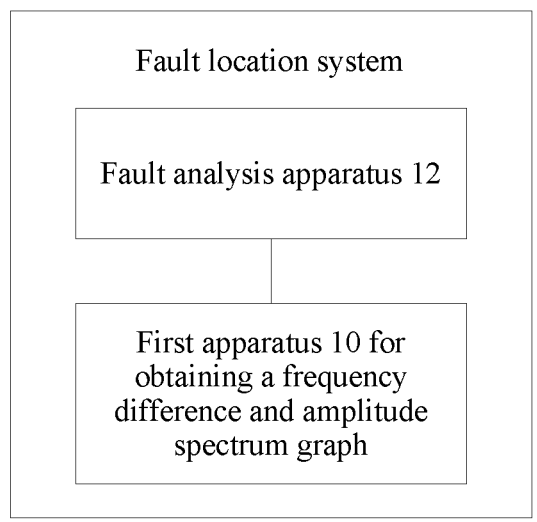
FIG. 20 is a schematic architectural diagram of another fault location system according to an embodiment of the present disclosure.

As shown in FIG. 20, the fault location system includes a first apparatus 10 for obtaining a frequency difference and amplitude spectrum graph and a fault analysis apparatus 12 connected to the first apparatus 10 for obtaining a frequency difference and amplitude spectrum graph. The first apparatus for obtaining a frequency difference and amplitude spectrum graph may be the apparatus for obtaining a frequency difference and amplitude spectrum graph shown in any one of FIG. 2 to FIG. 6 in the embodiments above. The first apparatus 10 for obtaining a frequency difference and amplitude spectrum graph is configured to: when a fault occurs in the DAS, for each of at least one branch circuit of the multiple branch circuits, send a detection signal to the branch circuit through a signal input end of the DAS, receive an echo signal returned by the branch circuit, superpose the detection signal and the echo signal, perform spectrum conversion on a superposed signal to obtain a fault frequency difference and amplitude spectrum graph, and send the fault frequency difference and amplitude spectrum graph to the fault analysis apparatus 12. The echo signal is a signal obtained after the detection signal is reflected by the M coupling nodes on the main circuit and the N antenna nodes and the K coupling nodes on the branch circuit through which the detection signal passes in sequence. The fault frequency difference and amplitude spectrum graph is used to indicate a correspondence between a location of each node of the M coupling nodes on the main circuit and the N antenna nodes and the K coupling nodes on the branch circuit and an amplitude of an echo signal corresponding to the node when a fault occurs on the branch circuit. The fault analysis apparatus 12 is configured to receive the fault frequency difference and amplitude spectrum graph sent by the first apparatus 10 for obtaining a frequency difference and amplitude spectrum graph, mutually verify the fault frequency difference and amplitude spectrum graph and a standard frequency difference and amplitude spectrum graph in the fault analysis apparatus 12, and determine a faulty node in the M coupling nodes on the main circuit and the N antenna nodes and the K coupling nodes on the branch circuit. An amplitude of an echo signal corresponding to the faulty node in the fault frequency difference and amplitude spectrum graph is different from an amplitude of an echo signal corresponding to the faulty node in the standard frequency difference and amplitude spectrum graph. The standard frequency difference and amplitude spectrum graph is used to indicate a correspondence between the location of each node of the M coupling nodes on the main circuit and the N antenna nodes and the K coupling nodes on the branch circuit and an amplitude of an echo signal corresponding to the node when no fault occurs on the branch circuit.

Optionally, the foregoing standard frequency difference and amplitude spectrum graph in the fault analysis apparatus 12 may be obtained and sent to the fault analysis apparatus 12 by the foregoing first apparatus 10 for obtaining a frequency difference and amplitude spectrum graph. The standard frequency difference and amplitude spectrum graph may be the foregoing frequency difference and amplitude spectrum graph shown in FIG. 19. In this embodiment of the present disclosure, the standard frequency difference and amplitude spectrum graph may be the frequency difference and amplitude spectrum graph obtained by the apparatus for obtaining a frequency difference and amplitude spectrum graph shown in any one of FIG. 2 to FIG. 6 in the embodiments above. That is, the frequency difference and amplitude spectrum graph obtained by the apparatus for obtaining a frequency difference and amplitude spectrum graph shown in any one of FIG. 2 to FIG. 6 is a frequency difference and amplitude spectrum graph obtained when no fault occurs in the DAS and after the locations of the nodes are determined.

For example, when a fault occurs on the branch circuit 1 in the DAS shown in FIG. 1 or FIG. 17, the fault analysis apparatus may mutually verify the fault frequency difference and amplitude spectrum graph obtained by the fault analysis apparatus and the standard frequency difference and amplitude spectrum graph. If it is determined that an amplitude (denoted as G1) of a node in the fault frequency difference and amplitude spectrum graph is different from an amplitude (denoted as Z1) of the node in the standard frequency difference and amplitude spectrum graph, for example, when there is a relatively large difference between the two (for example, G1 increases or decreases sharply when compared with Z1), the fault analysis apparatus may determine that the node in the standard frequency difference and amplitude spectrum graph is a faulty node. In this way, the fault location system provided in this embodiment of the present disclosure can be used to locate a faulty node in the DAS, thereby accurately locating a fault source in the DAS.

Figure 21:
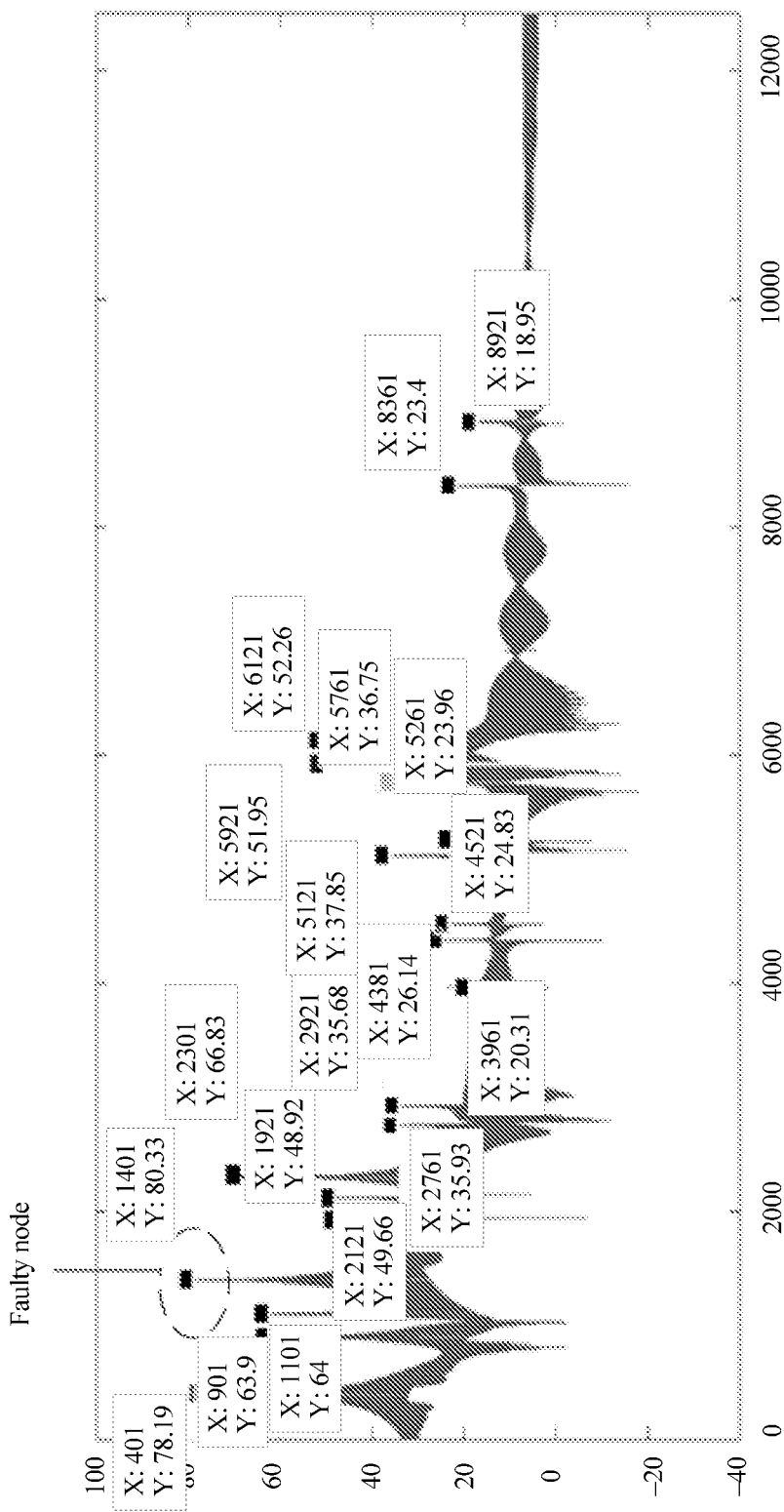
FIG. 21 is a simulation diagram of a fault frequency difference and amplitude spectrum graph according to an embodiment of the present disclosure.

For example, it is assumed that FIG. 21 is a fault frequency difference and amplitude spectrum graph detected and obtained by a first fault detection apparatus when a fault occurs on the antenna node A11 on the branch circuit 1 in the DAS shown in FIG. 1 or FIG. 17. The fault analysis apparatus compares the fault frequency difference and amplitude spectrum graph shown in FIG. 21 and the standard frequency difference and amplitude spectrum graph shown in FIG. 19. It is discovered that an amplitude of an echo signal obtained after a detection signal is reflected by the antenna node A11 is 66.94 in the standard frequency difference and amplitude spectrum graph shown in FIG. 19, and that an amplitude of an echo signal obtained after a detection signal is reflected by the corresponding node is 80.33 in the fault frequency difference and amplitude spectrum graph shown in FIG. 21. There is a relatively large difference between the two. In addition, amplitudes, of echo signals obtained after a detection signal is reflected by other nodes, in the standard frequency difference and amplitude spectrum graph shown in FIG. 19 are basically the same as (that is, the same as or slightly different from) those in the fault frequency difference and amplitude spectrum graph shown in FIG. 21. Therefore, the fault analysis apparatus may determine that a faulty node is the antenna node A11 on the branch circuit 1 in the DAS.

It should be noted that, in this embodiment of the present disclosure, the branch circuit 1 in the DAS shown in FIG. 1 or FIG. 17 is used as an example; a horizontal coordinate in FIG. 8, FIG. 15A to FIG. 15E, FIG. 19, and FIG. 21 represents a round-trip distance, on the branch circuit 1, of a detection signal corresponding to a node (that is, an antenna node or a coupling node) on the branch circuit 1 (that is, a distance through which a detection signal is transmitted after the detection signal sent by the first apparatus for obtaining a frequency difference and amplitude spectrum graph reaches a node and returns to the first apparatus for obtaining a frequency difference and amplitude spectrum graph after being reflected by the node); and a vertical coordinate represents an amplitude of an echo signal obtained after the detection signal is reflected by the node on the branch circuit 1.

The round-trip distance, of the detection signal on the branch circuit 1, represented by a horizontal coordinate shown in FIG. 21 may also be represented by using a transmission delay (for example, a round-trip delay) of the detection signal on the branch circuit 1. For specific description of using a transmission delay to represent the round-trip distance, refer to related description of using a transmission delay to represent a cable length in the embodiments above. Details are not described herein again.

In the fault location system provided in this embodiment of the present disclosure, when a fault occurs in the DAS, the first apparatus for obtaining a frequency difference and amplitude spectrum graph is configured to obtain a fault frequency difference and amplitude spectrum graph of a branch circuit on which a fault occurs in the DAS. The fault frequency difference and amplitude spectrum graph indicates the correspondence between the location of each node of the M coupling nodes on the main circuit and the N antenna nodes and the K coupling nodes on the branch circuit and the amplitude of the echo signal corresponding to the node when a fault occurs on the branch circuit, and the standard frequency difference and amplitude spectrum graph in the fault analysis apparatus indicates the correspondence between the location of each node of the M coupling nodes on the main circuit and the N antenna nodes and the K coupling nodes on the branch circuit and the amplitude of the echo signal corresponding to the node when no fault occurs on the branch circuit. Therefore, the fault analysis apparatus is configured to mutually verify the fault frequency difference and amplitude spectrum graph and the standard frequency difference and amplitude spectrum graph, to determine whether the amplitude of the echo signal corresponding to each node in the fault frequency difference and amplitude spectrum graph is the same as the amplitude of the echo signal corresponding to each node in the standard frequency difference and amplitude spectrum graph, and determine, as a faulty node, a node corresponding to an echo signal whose amplitudes in the two frequency difference and amplitude spectrum graphs are different. In this way, the fault location system provided in this embodiment of the present disclosure can locate a faulty node in the DAS, thereby accurately locating a fault source in the DAS.

An embodiment of the present disclosure provides an antenna system. The antenna system includes a fault location system and a DAS. The DAS includes one main circuit and multiple branch circuits. The main circuit includes M coupling nodes, and each branch circuit includes N antenna nodes and K coupling nodes, where M, N, and K are all positive integers. The fault location system may be the foregoing fault location system shown in FIG. 16 or FIG. 20. The DAS may be the foregoing DAS shown in FIG. 1. Specifically, for description of the fault location system, refer to related description of the fault location system in the embodiment shown in FIG. 16 or FIG. 20, and details are not described herein again. For description of the DAS, refer to related description of the DAS in the embodiment shown in FIG. 1, and details are not described herein again.

For example, the antenna system provided in this embodiment of the present disclosure may be a schematic architectural diagram when the fault location system shown in FIG. 17 is applied to a DAS. Specifically, for description of the antenna system, refer to related description in the embodiment shown in FIG. 17. Details are not described herein again.

In the antenna system provided in this embodiment of the present disclosure, when a fault occurs in the DAS in the antenna system, the foregoing fault location system may be configured to locate a faulty node in the DAS, thereby accurately locating a fault source in the DAS.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the mutual coupling or direct coupling or communication connection displayed or discussed can be indirect coupling or communication connection through some interfaces, devices, or units.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The foregoing integrated unit may be implemented in a form of a software functional unit.

When the integrated unit is implemented in the form of a software functional unit and sold or used as an independent product, the integrated unit may be stored in a computer-readable storage medium. Based on such an understanding, all or some of the technical solutions may be implemented in a form of a software product. The software product is stored in a storage medium, and includes several instructions for instructing a computer device (which may be a personal computer, a server, or a network device) or a processor to perform all or some of the steps of the methods described in the embodiments of this application. The storage medium is a non-transitory medium, and includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus for obtaining a frequency difference and amplitude spectrum graph in a distributed antenna system (DAS), wherein the DAS comprises a main circuit and a plurality of branch circuits, the main circuit comprises M coupling nodes, each branch circuit comprises N antenna nodes and K coupling nodes, and M, N, and K are all positive integers, the apparatus comprising:
a signal generation module;
a signal transmission module connected to the signal generation module;
a signal processing module connected to the signal transmission module; and
a signal analysis module connected to the signal processing module,
wherein the signal generation module is configured to generate a detection signal and send the detection signal to the signal transmission module;
the signal transmission module is configured to receive the detection signal sent by the signal generation module, and send the detection signal to the signal processing module and send the detection signal to at least one branch circuit through a signal input end of the DAS, receive an echo signal returned by the branch circuit, and send the echo signal to the signal processing module, wherein the echo signal is a signal obtained after the detection signal is reflected by the M coupling nodes on the main circuit and the N antenna nodes and the K coupling nodes on the branch circuit through which the detection signal passes in sequence;
the signal processing module is configured to receive the detection signal and the echo signal sent by the signal transmission module, superpose the detection signal and the echo signal, and send a superposed signal to the signal analysis module; and
the signal analysis module is configured to receive the superposed signal sent by the signal processing module, and perform spectrum conversion on the superposed signal to obtain a frequency difference and an amplitude spectrum graph, wherein the frequency difference and the amplitude spectrum graph is used to indicate a correspondence between a location of each node of the M coupling nodes on the main circuit and the N antenna nodes and the K coupling nodes on the branch circuit and an amplitude of the echo signal corresponding to the node.

2. The apparatus according to claim 1, wherein the signal transmission module comprises a power splitter, a circulator, and a transmission interface, wherein
an input end of the power splitter is connected to an output end of the signal generation module, a first output end of the power splitter is connected to a first end of the circulator, a second output end of the power splitter is connected to the signal processing module, a second end of the circulator is connected to the transmission interface, and a third end of the circulator is connected to the signal processing module;
the power splitter is configured to receive, through the input end of the power splitter, the detection signal sent by the signal generation module, send the detection signal to the circulator through the first output end of the power splitter, and send the detection signal to the signal processing module through the second output end of the power splitter; and
the circulator is configured to receive, through the first end of the circulator, the detection signal sent by the power splitter, and send the detection signal to the transmission interface through the second end of the circulator, wherein the detection signal is sent to the branch circuit through the transmission interface; and receive, through the second end of the circulator, the echo signal returned by the branch circuit, and send the echo signal to the signal processing module through the third end of the circulator.

3. The apparatus according to claim 2, wherein the signal processing module comprises a frequency mixer and a filter, wherein
a first input end of the frequency mixer is connected to the second output end of the power splitter, a second input end of the frequency mixer is connected to the third end of the circulator, an output end of the frequency mixer is connected to an input end of the filter, and an output end of the filter is connected to the signal analysis module;
the frequency mixer is configured to superpose the detection signal and the echo signal, and send the superposed signal to the filter; and
the filter is configured to receive the superposed signal sent by the frequency mixer, perform filtering on the superposed signal, and send the superposed signal on which filtering is performed to the signal analysis module.

4. The apparatus according to claim 3, wherein the signal analysis module comprises an analog-to-digital converter and a spectrum converter, wherein
an input end of the analog-to-digital converter is connected to the output end of the filter, and an output end of the analog-to-digital converter is connected to the spectrum converter;
the analog-to-digital converter is configured to convert the superposed signal that is output by the filter and on which filtering is performed to a digital signal, and send the digital signal to the spectrum converter; and
the spectrum converter is configured to receive the digital signal sent by the analog-to-digital converter and perform spectrum conversion on the digital signal to obtain the frequency difference and amplitude spectrum graph.

5. The apparatus according to claim 4, wherein the apparatus further comprises at least one of: an amplifier connected between the first input end of the frequency mixer and the second output end of the power splitter, an amplifier connected between the second input end of the frequency mixer and the third end of the circulator, and an amplifier connected between the input end of the analog-to-digital converter and the output end of the filter.

6. The apparatus according to claim 1, wherein
the detection signal is a linear frequency-modulated continuous-wave signal.

7. An apparatus for obtaining a frequency difference and amplitude spectrum graph, in a distributed antenna system DAS, wherein the DAS comprises a main circuit and a plurality of branch circuits, the main circuit comprises M coupling nodes, each branch circuit comprises N antenna nodes and K coupling nodes, and M, N, and K are all positive integers, the apparatus comprising at least one:
a first signal generation module;
a first signal transmission module connected to the first signal generation module;
a first signal processing module connected to the first signal transmission module; and
a first signal analysis module connected to the first signal processing module,
wherein the first signal generation module is configured to generate a detection signal and send the detection signal to the first signal transmission module;
the first signal transmission module is configured to receive the detection signal sent by the first signal generation module, and send the detection signal to the first signal processing module and send the detection signal to each of the N antenna nodes on at least one branch circuit and from at least one antenna node, receive a first echo signal returned by the branch circuit, and send the first echo signal to the first signal processing module, wherein the first echo signal is a signal obtained after the detection signal is reflected by the M coupling nodes on the main circuit, the at least one antenna node, and the K coupling nodes on the branch circuit through which the detection signal passes in sequence;
the first signal processing module is configured to receive the detection signal and the first echo signal sent by the first signal transmission module, superpose the detection signal and the first echo signal, and send a superposed signal to the first signal analysis module; and
the first signal analysis module is configured to receive the superposed signal sent by the first signal processing module, and perform spectrum conversion on the superposed signal to obtain a first frequency difference and a amplitude spectrum graph, wherein the first frequency difference and the amplitude spectrum graph is used to indicate a correspondence between a location of each node of the M coupling nodes on the main circuit, the at least one antenna node, and the K coupling nodes on the branch circuit and an amplitude of the first echo signal corresponding to the node.

8. The apparatus according to claim 7, wherein the first signal transmission module comprises a first power splitter, a first circulator, and a first transmission interface, wherein
an input end of the first power splitter is connected to an output end of the first signal generation module, a first output end of the first power splitter is connected to a first end of the first circulator, a second output end of the first power splitter is connected to the first signal processing module, a second end of the first circulator is connected to the first transmission interface, and a third end of the first circulator is connected to the first signal processing module;

the first power splitter is configured to receive, through the input end of the first power splitter, the detection signal sent by the first signal generation module, send the detection signal to the first circulator through the first output end of the first power splitter, and send the detection signal to the first signal processing module through the second output end of the first power splitter; and the first circulator is configured to receive, through the first end of the first circulator, the detection signal sent by the first power splitter, and send the detection signal to the first transmission interface through the second end of the first circulator, wherein the detection signal is sent to the branch circuit through the first transmission interface; and receive, through the second end of the first circulator, the first echo signal returned by the branch circuit, and send the first echo signal to the first signal processing module through the third end of the first circulator.

9. The apparatus according to claim 8, wherein the first signal processing module comprises a first frequency mixer and a first filter, wherein a first input end of the first frequency mixer is connected to the second output end of the first power splitter, a second input end of the first frequency mixer is connected to the third end of the first circulator, an output end of the first frequency mixer is connected to an input end of the first filter, and an output end of the first filter is connected to the first signal analysis module;

the first frequency mixer is configured to superpose the detection signal and the first echo signal, and send the superposed signal to the first filter; and the first filter is configured to receive the superposed signal sent by the first frequency mixer, perform filtering on the superposed signal, and send the superposed signal on which filtering is performed to the first signal analysis module.

10. The apparatus according to claim 9, wherein the first signal analysis module comprises a first analog-to-digital converter and a first spectrum converter, wherein an input end of the first analog-to-digital converter is connected to the output end of the first filter, and an output end of the first analog-to-digital converter is connected to the first spectrum converter;

the first analog-to-digital converter is configured to convert the superposed signal that is output by the first filter and on which filtering is performed to a digital signal, and send the digital signal to the first spectrum converter; and the first spectrum converter is configured to receive the digital signal sent by the first analog-to-digital converter and perform spectrum conversion on the digital signal to obtain the first frequency difference and amplitude spectrum graph.

11. The apparatus according to claim 10, wherein the apparatus further comprises at least one of the following three amplifiers of a first amplifier connected between the first input end of the first frequency mixer and the second output end of the first power splitter, a second amplifier connected between the second input end of the first frequency mixer and the third end of the first circulator, and a third amplifier connected between the input end of the first analog-to-digital converter and the output end of the first filter.

12. The apparatus according to claim 7, wherein the detection signal is a linear frequency-modulated continuous-wave signal.

13. A fault location system, for a distributed antenna system DAS, wherein the DAS comprises a main circuit and a plurality of branch circuits, the main circuit comprises M coupling nodes, each branch circuit comprises N antenna nodes and K coupling nodes, and M, N, and K are all positive integers, the fault location system comprising:

a first apparatus for obtaining a frequency difference and amplitude spectrum graph;

a second apparatus for obtaining a frequency difference and amplitude spectrum graph; and a fault analysis apparatus connected to both the first apparatus and the second apparatus, wherein the first apparatus comprises a signal generation module, a signal transmission module connected to the signal generation module, a signal processing module connected to the signal transmission module, and a signal analysis module connected to the signal processing module, and wherein the signal generation module is configured to generate a detection signal and send the detection signal to the signal transmission module;

the signal transmission module is configured to receive the detection signal sent by the signal generation module, and send the detection signal to the signal processing module and send the detection signal to at least one branch circuit through a signal input end of the DAS, receive an echo signal returned by the branch circuit, and send the echo signal to the signal processing module, wherein the echo signal is a signal obtained after the detection signal is reflected by the M coupling nodes on the main circuit and the N antenna nodes and the K coupling nodes on the branch circuit through which the detection signal passes in sequence;

the signal processing module is configured to receive the detection signal and the echo signal sent by the signal transmission module, superpose the detection signal and the echo signal, and send a superposed signal to the signal analysis module; and the signal analysis module is configured to receive the superposed signal sent by the signal processing module, and perform spectrum conversion on the superposed signal to obtain a frequency difference and an amplitude spectrum graph, wherein the frequency difference and the amplitude spectrum graph is used to indicate a correspondence between a location of each node of the M coupling nodes on the main circuit and the N antenna nodes and the K coupling nodes on the branch circuit and an amplitude of the echo signal corresponding to the node;

the second apparatus comprises a first signal generation module, a first signal transmission module connected to the first signal generation module, a first signal processing module connected to the first signal transmission module, and a first signal analysis module connected to the first signal processing module, wherein the first signal generation module is configured to generate a detection signal and send the detection signal to the first signal transmission module;

the first signal transmission module is configured to receive the detection signal sent by the first signal generation module, and send the detection signal to the first signal processing module and send the detection signal to each of the N antenna nodes on the branch circuit on at least one branch circuit and from at least one antenna node, receive a first echo signal returned by the branch circuit, and send the first echo signal to the first signal processing module, wherein the first echo signal is a signal obtained after the detection signal is reflected by the M coupling nodes on the main circuit, the at least one antenna node, and the K coupling nodes on the branch circuit through which the detection signal passes in sequence;

the first signal processing module is configured to receive the detection signal and the first echo signal sent by the first signal transmission module, superpose the detection signal and the first echo signal, and send a superposed signal to the first signal analysis module; and the first signal analysis module is configured to receive the superposed signal sent by the first signal processing module, and perform spectrum conversion on the superposed signal to obtain a first frequency difference and an amplitude spectrum graph, wherein the first frequency difference and the amplitude spectrum graph is used to indicate a correspondence between a location of each node of the M coupling nodes on the main circuit, the antenna node, and the K coupling nodes on the branch circuit and an amplitude of the first echo signal corresponding to the node; and wherein the fault analysis apparatus is configured to: for each of at least one branch circuit of the multiple branch circuits, and for at least one first frequency difference and amplitude spectrum graph of N first frequency difference and amplitude spectrum graphs that are sent by the second apparatus for obtaining a frequency difference and amplitude spectrum graph and that are corresponding to the N antenna nodes on the branch circuit, mutually verify each of the at least one first frequency difference and amplitude spectrum graph and a frequency difference and amplitude spectrum graph sent by the first apparatus for obtaining a frequency difference and amplitude spectrum graph; determine, in the frequency difference and amplitude spectrum graph, a location of each antenna node shown in the first frequency difference and amplitude spectrum graph and a location of a coupling node in the vicinity of at least one of the antenna nodes; and determine, in the frequency difference and amplitude spectrum graph, a location of at least one of the M coupling nodes on the main circuit and locations of at least one antenna node and at least one coupling node on the branch circuit.

14. The fault location system according to claim 13, wherein the first signal transmission module comprises a first power splitter, a first circulator, and a first transmission interface, wherein an input end of the first power splitter is connected to an output end of the first signal generation module, a first output end of the first power splitter is connected to a first end of the first circulator, a second output end of the first power splitter is connected to the first signal processing module, a second end of the first circulator is connected to the first transmission interface, and a third end of the first circulator is connected to the first signal processing module;

the first power splitter is configured to receive, through the input end of the first power splitter, the detection signal sent by the first signal generation module, send the detection signal to the first circulator through the first output end of the first power splitter, and send the detection signal to the first signal processing module through the second output end of the first power splitter; and the first circulator is configured to receive, through the first end of the first circulator, the detection signal sent by the first power splitter, and send the detection signal to the first transmission interface through the second end of the first circulator, wherein the detection signal is sent to the branch circuit through the first transmission interface; and receive, through the second end of the first circulator, the first echo signal returned by the branch circuit, and send the first echo signal to the first signal processing module through the third end of the first circulator.

15. The fault location system according to claim 14, wherein the first signal processing module comprises a first frequency mixer and a first filter, wherein a first input end of the first frequency mixer is connected to the second output end of the first power splitter, a second input end of the first frequency mixer is connected to the third end of the first circulator, an output end of the first frequency mixer is connected to an input end of the first filter, and an output end of the first filter is connected to the first signal analysis module;

the first frequency mixer is configured to superpose the detection signal and the first echo signal, and send the superposed signal to the first filter; and the first filter is configured to receive the superposed signal sent by the first frequency mixer, perform filtering on the superposed signal, and send the superposed signal on which filtering is performed to the first signal analysis module.

16. A fault location system, for a distributed antenna system DAS, wherein the DAS comprises a main circuit and a plurality of branch circuits, the main circuit comprises M coupling nodes, each branch circuit comprises N antenna nodes and K coupling nodes, and M, N, and K are all positive integers, the fault location system comprising:

a first apparatus for obtaining a frequency difference and amplitude spectrum graph and a fault analysis apparatus connected to the first apparatus for obtaining a frequency difference and amplitude spectrum graph, wherein the first apparatus is configured to, when a fault occurs in the DAS, for each of at least one branch circuit of the multiple branch circuits, send a detection signal to the branch circuit through a signal input end of the DAS, receive an echo signal returned by the branch circuit, superpose the detection signal and the echo signal, perform spectrum conversion on a superposed signal to obtain a fault frequency difference and amplitude spectrum graph, and send the fault frequency difference and amplitude spectrum graph to the fault analysis apparatus, wherein the echo signal is a signal obtained after the detection signal is reflected by the M coupling nodes on the main circuit and the N antenna nodes and the K coupling nodes on the branch circuit through which the detection signal passes in sequence, and the fault frequency difference and amplitude spectrum graph is used to indicate a correspondence between a location of each node of the M coupling nodes on the main circuit and the N antenna nodes and the K coupling nodes on the branch circuit and an amplitude of an echo signal corresponding to the node when a fault occurs on the branch circuit; and the fault analysis apparatus is configured to receive the fault frequency difference and amplitude spectrum graph sent by the first apparatus, mutually verify the fault frequency difference and amplitude spectrum graph and a standard frequency difference and amplitude spectrum graph in the fault analysis apparatus, and determine a faulty node in the M coupling nodes on the main circuit and the N antenna nodes and the K coupling nodes on the branch circuit, wherein an amplitude of an echo signal corresponding to the faulty node in the fault frequency difference and amplitude spectrum graph is different from an amplitude of an echo signal corresponding to the faulty node in the standard frequency difference and amplitude spectrum graph, and the standard frequency difference and amplitude spectrum graph is used to indicate a correspondence between the location of each node of the M coupling nodes on the main circuit and the N antenna nodes and the K coupling nodes on the branch circuit and an amplitude of an echo signal corresponding to the node when no fault occurs on the branch circuit.

17. The fault location system according to claim 16, wherein the signal transmission module comprises a power splitter, a circulator, and a transmission interface, wherein
an input end of the power splitter is connected to an output end of the signal generation module, a first output end of the power splitter is connected to a first end of the circulator, a second output end of the power splitter is connected to the signal processing module, a second end of the circulator is connected to the transmission interface, and a third end of the circulator is connected to the signal processing module;
the power splitter is configured to receive, through the input end of the power splitter, the detection signal sent by the signal generation module, send the detection signal to the circulator through the first output end of the power splitter, and send the detection signal to the signal processing module through the second output end of the power splitter; and
the circulator is configured to receive, through the first end of the circulator, the detection signal sent by the power splitter, and send the detection signal to the transmission interface through the second end of the circulator, wherein the detection signal is sent to the branch circuit through the transmission interface; and receive, through the second end of the circulator, the echo signal returned by the branch circuit, and send the echo signal to the signal processing module through the third end of the circulator.

18. The fault location system according to claim 17, wherein the signal processing module comprises a frequency mixer and a filter, wherein
a first input end of the frequency mixer is connected to the second output end of the power splitter, a second input end of the frequency mixer is connected to the third end of the circulator, an output end of the frequency mixer is connected to an input end of the filter, and an output end of the filter is connected to the signal analysis module;
the frequency mixer is configured to superpose the detection signal and the echo signal, and send the superposed signal to the filter; and
the filter is configured to receive the superposed signal sent by the frequency mixer, perform filtering on the superposed signal, and send the superposed signal on which filtering is performed to the signal analysis module.

* * * * *